(12) United States Patent
Nardella

(10) Patent No.: US 10,550,911 B2
(45) Date of Patent: Feb. 4, 2020

(54) INTERNAL COMBUSTION PISTON ENGINE FOR AVIATION

(71) Applicant: Francis A Nardella, Scottsdale, AZ (US)

(72) Inventor: Francis A Nardella, Scottsdale, AZ (US)

(*) Notice: Subject to any disclaimer, the term of this patent is extended or adjusted under 35 U.S.C. 154(b) by 0 days.

(21) Appl. No.: 15/743,594

(22) PCT Filed: Jul. 22, 2016

(86) PCT No.: PCT/US2016/043535
§ 371 (c)(1),
(2) Date: Jan. 10, 2018

(87) PCT Pub. No.: WO2017/015551
PCT Pub. Date: Jan. 26, 2017

(65) Prior Publication Data
US 2018/0202513 A1    Jul. 19, 2018

Related U.S. Application Data

(60) Provisional application No. 62/195,611, filed on Jul. 22, 2015.

(51) Int. Cl.
*F16F 15/10* (2006.01)
*B64D 27/04* (2006.01)
*F01L 1/02* (2006.01)
*F02B 61/04* (2006.01)
*F01L 1/047* (2006.01)
(Continued)

(52) U.S. Cl.
CPC .............. *F16F 15/10* (2013.01); *B64D 27/04* (2013.01); *F01L 1/026* (2013.01); *F01L 1/047* (2013.01);
(Continued)

(58) Field of Classification Search
CPC . F16F 15/10; F16F 15/00; F16F 15/20; B64D 27/04; B64D 27/00; B64D 27/02;
(Continued)

(56) References Cited

U.S. PATENT DOCUMENTS 1,580,082 A    4/1926   Ybarra
1,627,108 A *  5/1927   Morehouse ............. F02B 73/00
                                                          123/41.69
(Continued)

FOREIGN PATENT DOCUMENTS

DE    19525059        1/1997
GB    171382 A *      2/1923   ............. F02B 61/04
GB    1234411         6/1971

*Primary Examiner* — George C Jin
(74) *Attorney, Agent, or Firm* — Richard E. Oney; Venjuris, P.C.

(57) ABSTRACT

An internal combustion engine for use with a propeller driven aircraft includes a camshaft adapted to function as an output shaft that rotates a propeller to provide propulsive thrust. A gear set is configured to transfer rotational power from the crankshaft to the camshaft and to rotate the camshaft at a velocity that is proportional to the rotational velocity of the crankshaft. The gear set is disposed rearward of the engine housing rearward wall and is configured to rotate the camshaft in a direction opposite the crankshaft rotation. The length of the camshaft reduces engine torsional vibration. In one embodiment, the engine is a six-cylinder compression ignition engine having a boxer configuration and can generate a peak output power within a range from about 300 horsepower to about 350 horsepower.

19 Claims, 20 Drawing Sheets

(51) Int. Cl.
*F16F 15/20* (2006.01)
*F16F 15/00* (2006.01)
*F02B 9/02* (2006.01)
*F02B 75/24* (2006.01)
*F02B 75/18* (2006.01)

(52) U.S. Cl.
CPC ............... *F02B 9/02* (2013.01); *F02B 61/04* (2013.01); *F02B 75/243* (2013.01); *F16F 15/00* (2013.01); *F16F 15/20* (2013.01); *F01L 2001/0476* (2013.01); *F01L 2001/054* (2013.01); *F01L 2250/02* (2013.01); *F01L 2250/04* (2013.01); *F01L 2250/06* (2013.01); *F01L 2810/03* (2013.01); *F02B 2075/1824* (2013.01)

(58) Field of Classification Search
CPC .. F02B 39/14; F02B 67/10; F02B 9/02; F02B 73/00; F02B 75/243; F02B 61/04; F02B 61/06; F01L 1/026; F01L 1/047
See application file for complete search history.

(56) References Cited

U.S. PATENT DOCUMENTS

| | | | | |
|---|---|---|---|---|
| 3,007,350 | A | * 11/1961 | Wiseman | B64C 11/44 105/108 |
| 3,421,490 | A | * 1/1969 | Wiseman | F02B 37/00 123/195 R |
| 3,447,515 | A | * 6/1969 | Wiseman | F01L 1/047 123/195 A |
| 5,083,544 | A | * 1/1992 | Brighigna | F01L 1/024 123/507 |
| 5,513,601 | A | * 5/1996 | Benson | F02B 61/04 123/195 R |
| 6,536,382 | B1 | * 3/2003 | Wilksch | F01M 11/067 123/41.48 |
| 7,240,648 | B2 | 7/2007 | Alessandrini | |
| 2009/0007775 | A1 | 1/2009 | Seymour et al. | |
| 2012/0256046 | A1 | * 10/2012 | Braly | F02P 5/04 244/59 |

* cited by examiner

INTERNAL COMBUSTION PISTON ENGINE FOR AVIATION

RELATED APPLICATION AND PRIORITY CLAIM

This application claims the benefit of U.S. Provisional Application No. 62/195,611, filed Jul. 22, 2015, entitled "Internal Combustion Piston Engine For Aviation" which is incorporated herein in its entirety by this reference.

FIELD OF THE INVENTION

The present invention relates to internal combustion piston engines for aviation. More particularly, it relates to an internal combustion piston engine that is configured so that dominant engine harmonic excitation frequencies converge with the drive train mode 1 natural frequency at lower rotational speeds out of the high speed normal operating range of the engine, thereby reducing torsional moments, gear hammering due to high amplitude torque reversals and torsional stress. In certain embodiments of the engine, the camshaft, in addition to its standard role in controlling the opening and closing of poppet valves, provides gear reduction, torsional vibration reduction and power transmission to the propeller.

BACKGROUND

Piston engines for general aviation are typically large displacement, direct drive, air-cooled, spark-ignition engines that burn leaded aviation fuel and typically run between 2300 and 2700 rpm. At higher revolutions per minute ("rpm"), the propeller speed approaches the speed of sound with corresponding decreases in efficiency.

Aviation fuel is considered a boutique fuel; it is expensive and not available in many parts of the world. The future of the fuel is also in question because it contains lead. For these reasons, considerable effort has been expended to develop viable compression ignition engines for general aviation to burn jet and diesel fuel. In addition to burning jet fuel, which is widely available and cheaper, compression ignition engines are more efficient, and jet fuel and diesel fuel have higher energy densities than aviation gasoline. The jet fuel burning turboprop and turbojet solutions with power, weight and reliability advantages over reciprocating engines, are not economically viable for much of general aviation at this time because the costs and fuel burn are much higher.

Engine power is directly related to pressure on the pistons, engine displacement and rpm. In order to generate the necessary power at lower rpm needed for the propeller using direct propeller drive, standard aviation spark ignition engines have large displacements. For example, the Continental TSIO-550-K has a displacement of 9.05 l (550 in$^3$). It generates 315 hp (235 kW) at 2500 rpm and has an uninstalled weight of 578.4 lbs (262.4 kg) with twin turbochargers. It is used in the most commercially successful single engine general aviation aircraft currently available, the Cirrus SR22T, which is a 4/5 place aircraft with 3600 lbs. gross weight and typically flies at cruise speeds approaching 200 kts (230 mph). The TSIO-550 and its TIO-540 Lycoming counterpart spark ignition engine series represent the current state of the art in general aviation and reflects the power and weight targets to be achieved in the preferred embodiment of this invention.

Efforts to develop viable compression ignition engines for general aviation have been met with difficulty. These engines typically weigh more than spark ignition engines to constrain the increases in pressure generated. Current efforts include both larger displacement air and oil cooled direct drive engines and smaller displacement liquid cooled engines running at higher rpm and incorporating propeller speed reduction gearboxes. The larger displacement direct drive engines may not succeed in meeting the weight requirements to produce power in the 300 hp range. The gearboxes of smaller displacement engines are susceptible to the potentially destructive effects of torsional vibration characteristic of compression ignition engines.

Thielert, now owned by Continental Motors (which is a subsidiary of the Aviation Industry Corporation of China (AVIC), in turn owned by the Peoples Republic of China), introduced the first commercially successful application of a compression ignition engine for general aviation, the Centurion 1.7. It is a 1.689 l (103 in$^3$), 134 kg (295 lbs.) turbocharged engine producing 135 hp (101 kW) based on a Mercedes 4-cylinder in line, liquid cooled, double overhead camshaft engine. An aluminum alloy block was substituted for the iron block used in Mercedes engines. The engine was certified by EASA ("European Aviation Safety Agency") in 2002 and the FAA ("Federal Aviation Administration") in 2003. Production ceased in 2006 when production of the Centurion 2.0 (now CD 135) began. The 2.0 is a 1.991 liter (121.5 in$^3$) variant, with the same weight and power as the 1.7, which also uses a Mercedes engine block. This was followed later by the 2.0S (now CD 155) with 155 hp (114 kW). The rpm of these engines at maximum power is 3890 with a propeller speed reduction gearbox ratio of 1:1.69.

Problems with these compression ignition engines have been significant. They suffer from a relatively poor reliability, as compared to air-cooled spark ignition aviation piston engines, for which the expected time before overhaul ("TBO") is 2000 hrs. The early Centurion 1.7 l variant was discontinued in 2006. The time before replacement ("TBR") for the engine is 1000 hours with mandatory clutch and gearbox teardown and inspection every 300 hours. The Centurion 2.0 has a TBR of 1500 hrs. with gearbox inspections every 600 hrs. The Centurion 2.0S has a TBR of 1200 hours, with gearbox inspections every 600 hours. The development of the V8 Centurion 4, 3.996 l (243.9 in$^3$), 350 hp (246 kW) with gearbox and weighing 600 lbs. (272.2 kg) uninstalled has not been completed. Continental Motors is now developing the CD 300, a V6, 3 l variant that generates 310 hp (228 kW) at 2300 rpm. It is adapted from a Mercedes auto engine with gear reduction and weighs 560 lbs. uninstalled. There may be multiple reasons for the relatively poor reliability of these engines and their gearboxes, but a major factor is likely the torsional vibration inherent in compression ignition engines. These problems may even be greater for the higher power CD 300 with six-cylinder, four-stroke dominant 3$^{rd}$ order harmonic torsional excitation.

Because of dissatisfaction with the Centurion engines, Diamond Aircraft Industries, the initial prime user of the Centurion engines, founded Austro Engines with its partners in 2007 and has developed the AE 300. The AE 300 engine is a 4-cylinder, in line, liquid cooled, turbocharged, 1.991 l engine that generates 168 hp (123.5 kW) at 3880 rpm and weighs 414 lbs. (185 kg) uninstalled. It also is based on a Mercedes engine block and has a speed reduction gearbox (1:1.69). It retains the heavier iron block design of the original Mercedes engine. It has received certification for a TBO of 1800 hours for the engine and gearbox from EASA.

SMA (Societe de Motorisations Aeronautiques), a subsidiary of Snecma (Safran), has developed the SR305 compression ignition engine, which is similar in design to existing general aviation spark ignition engines. The SR305 is an opposed four cylinder, air and oil cooled, direct drive, compression ignition engine with a displacement of 5 l (305 in$^3$), which produces 227 hp (169.3 kW) at 2200 rpm and weighs 455 lbs. (206.4 kg) uninstalled. It has a TBO of 2400 hrs. It was certified by EASA and the FAA in 2011. SMA is working on a 260-280 hp variant and is also developing the SR460, a 6-cylinder 300 hp range version, which likely will weigh more than 600 lbs. uninstalled and may not meet the weight requirements for the Cirrus SR22 class of aircraft. Continental Motors has purchased the rights to the smaller SR305. Its own version, the CD 230 has been certified and they are working on a CD 250 variant Engineered Propulsion Systems ("EPS") is developing an aero diesel engine. Its approach has been to use a 180 degree V8 liquid cooled, turbocharged engine with overhead camshafts and 4.4 l displacement to achieve 350 hp with gear reduction. EPS is proposing to reduce engine vibration by arranging the cylinders horizontally opposed with paired throw crankpins, using a compacted graphite iron crankcase, a first order balance shaft, an internal torsional vibration absorber and tuned isolation. It is uncertain whether this engine will escape the issues that have plagued the previous compression ignition engines with gearboxes. The uninstalled weight is about 600 lbs. and when installed may not meet the weight requirements for the Cirrus SR22 class of general aviation aircraft.

Previous attempts have been made to avoid the need for a separate propeller speed reduction gearbox by proposing pushrod engine configurations that drive the propeller in concert with the camshaft. In a four stoke internal combustion engine, a camshaft is used to mechanically control the opening of the intake and exhaust valves during the engine cycle to allow the charging of the cylinders with air or air fuel mixtures and to exhaust the burnt gases. Camshafts, by nature of their function in a four stoke internal combustion piston engine, rotate at ½ the rate as the crankshaft. In configurations where the camshaft is not placed overhead of the crankshaft, it opens and closes the intake and exhaust valves by driving pushrods acting on rocker arms. The camshaft is commonly driven by gears or chains connected with the crankshaft. Camshafts are also commonly placed overhead of the valves either singly or in pairs where they drive the intake and exhaust valves directly and in this instance would be less suitable as power output shafts.

Engine configurations that drive the propeller with a shaft in common with the camshaft are described in U.S. Pat. No. 1,438,289 to Barbarou, U.S. Pat. No. 1,580,082 to Ybarra, U.S. Pat. No. 1,627,108 to Morehouse, U.S. Pat. No. 3,421,490 to Wiseman and U.S. Pat. No. 3,447,515 to Wiseman, et al. All of these patents disclose a shaft in common with the camshaft driving the propeller with the gearing at the front of the engine close to the propeller. As explained in this specification, however, engines that utilize a camshaft for power output to the propeller with forward gear reduction (sometimes referred to herein as the CDSE-FG configuration) will still suffer from significant torsional vibration similar to the standard gear reduction configurations where a dedicated gearbox is mounted at the front of the engine and connected to the propeller with a short propeller drive shaft with corresponding high maintenance and reliability problems.

U.S. Pat. No. 5,513,601 to Benson discloses a V-8 spark ignition engine with a dedicated propeller shaft and separate camshafts. The propeller shaft is coupled to the crankshaft via rear gearing and the camshafts are coupled to the propeller shaft via timing belts. According to Benson, the longer propeller shaft of this arrangement allows for more solid bearing support to absorb torsional and other loads originating from the propeller, which Benson claims reduces the transfer of these forces to the gears, crankshaft and other engine parts. Benson fails to consider the use of the camshaft with rear gearing to drive the propeller.

There is a need, therefore, for an internal combustion piston engine for aircraft that is suitable for burning jet or diesel fuel, which meets the weight requirements for the Cirrus SR22 class of general aviation aircraft, and which is more reliable and requires less maintenance than previous engines. It is an object of the present invention to provide such an apparatus. Such an engine might also find use in other applications including unmanned aircraft, marine craft and certain land vehicles.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided an internal combustion engine for use with a propeller driven aircraft. The engine includes a crank case housing having a forward wall, a rearward wall and a crankshaft journaled within the engine housing and rotatable about a crankshaft axis. The crankshaft is configured to be rotatably driven by a plurality of pistons, and the crankshaft rear end extends through the housing rearward wall. A camshaft is journaled within the engine housing and has a front end that extends through the housing forward wall and a rear end that extends through the housing rearward wall. The camshaft is rotatable about a camshaft axis that is parallel to the crankshaft axis. A gear set is configured to transfer rotational power from the crankshaft to the camshaft and to rotate the camshaft at a velocity that is proportional to the rotational velocity of the crankshaft. The gear set is disposed rearward of the engine housing rearward wall. The camshaft is adapted to function as an output shaft that rotates a propeller to provide propulsive thrust.

In one advantageous embodiment, the engine is a six-cylinder compression ignition engine having a boxer configuration. The engine has a peak output power within a range from about 300 horsepower to about 350 horsepower. The gears of the gear set are adapted to transfer power to the camshaft for driving the propeller and to rotate the camshaft in a direction opposite the crankshaft rotation.

In accordance with another aspect of my invention, an internal combustion engine for use with a propeller driven aircraft includes a crank case housing having a forward wall and a rearward wall and a drive train. The drive train includes a crankshaft and a power output shaft. The crankshaft is journaled within the engine housing and is rotatable about a crankshaft axis. The crankshaft is configured to be rotatably driven by a plurality of pistons and the crankshaft rear end extends through the housing rearward wall. The power output shaft is journaled within the engine housing and has a front end that extends through the housing forward wall and a rear end that extends through the housing rearward wall. The power output shaft is rotatable about an output axis that is generally parallel to the crankshaft axis. A gear set is configured to transfer rotational power from the crankshaft to the power output shaft and to rotate the power output shaft at a velocity that is proportional to the rotational velocity of the crankshaft. The gear set is disposed rearward of the engine housing rearward wall. The engine drive train has a mode 1 natural frequency that converges with dominant engine harmonic excitation frequencies at a speed that is displaced below the engine high speed normal operating range.

Engine configurations according to the present invention provide marked reduction in torsional vibration originating in the engine as compared to previously known configurations. The mechanism for torsional vibration reduction is a result of the increase in length of the power train that reduces its first mode natural frequency. This is accomplished without increasing the length of the engine by using the camshaft (in the case of a four-stroke pushrod engine as the power transmission shaft with 2:1 gear reduction). Simulation studies of an engine configuration according to the present invention (which are described below) show that convergence of the lower first mode natural frequency with dominant engine excitation harmonics occurs at lower rpm. Further, these studies show that resonance at the lower speed is associated with a marked reduction in torsional vibration.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention.

DESCRIPTION

Reference in this application is made to presently preferred embodiments of the invention. While the invention is described more fully with reference to these examples, the invention in its broader aspects is not limited to the specific details, representative devices, and illustrative examples shown and described. Rather, the description is to be understood as a broad, teaching disclosure directed to persons of ordinary skill in the appropriate arts, and not as limiting upon the invention.

It will be appreciated that terms such as "forward," "rearward," "upper," "inner," "outer," "vertical," "horizontal," "bottom," "below," "top," "side," "inwardly," "outwardly," "downwardly" and "lower" and other positionally descriptive terms used in this specification are used merely for ease of description and refer to the orientation of the referenced components as shown in the figures. It should be understood that any orientation of the components described herein is within the scope of the present invention. The term "generally" as used in this specification is defined as "being in general but not necessarily exactly or wholly that which is specified." For example, "generally parallel" is used herein to indicate components that are in general, but not necessarily exactly or wholly, parallel.

Engine Configuration

Figure 1:
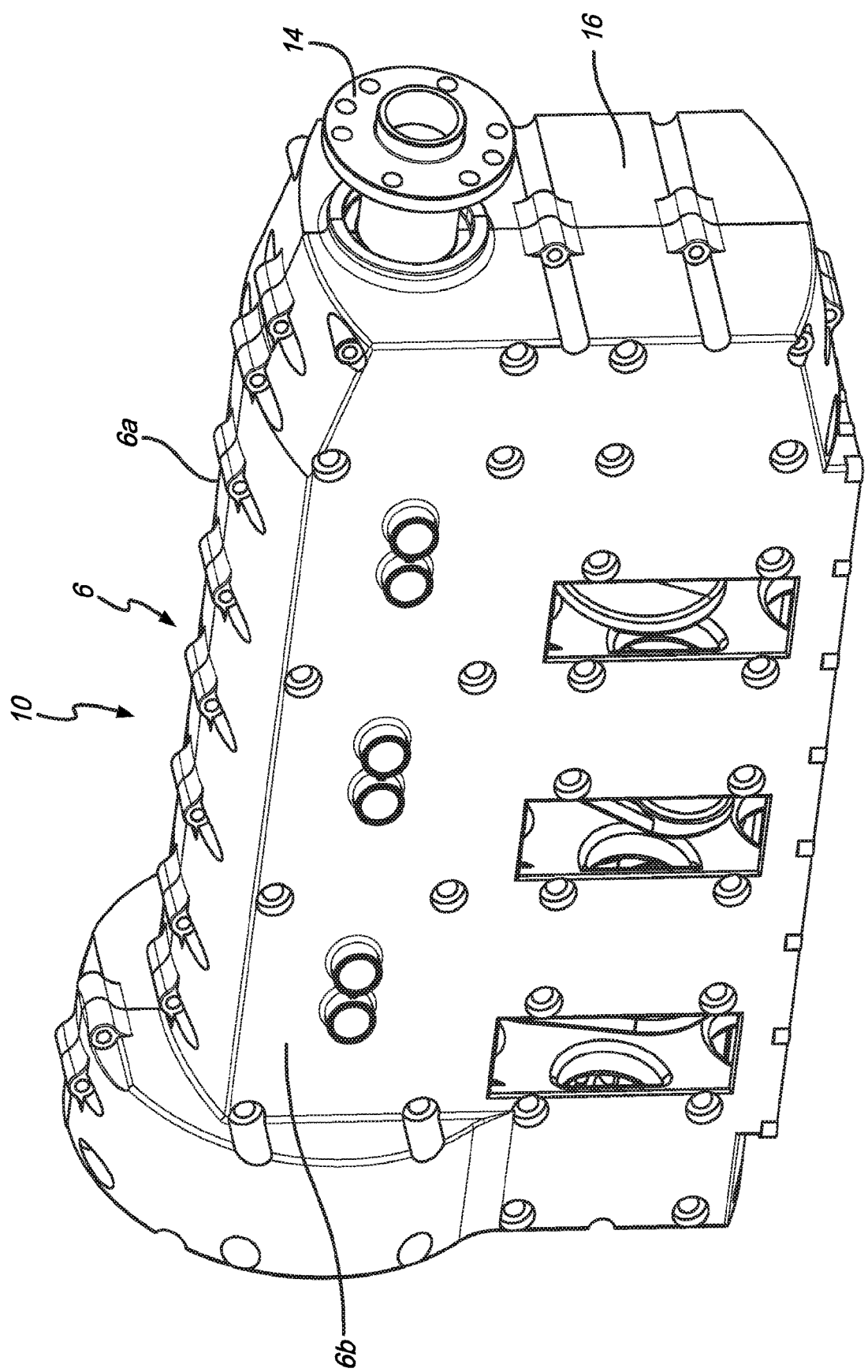
FIG. 1 is a perspective view of one embodiment of a crankcase assembly for an internal combustion engine according to the present invention.
Figure 2:
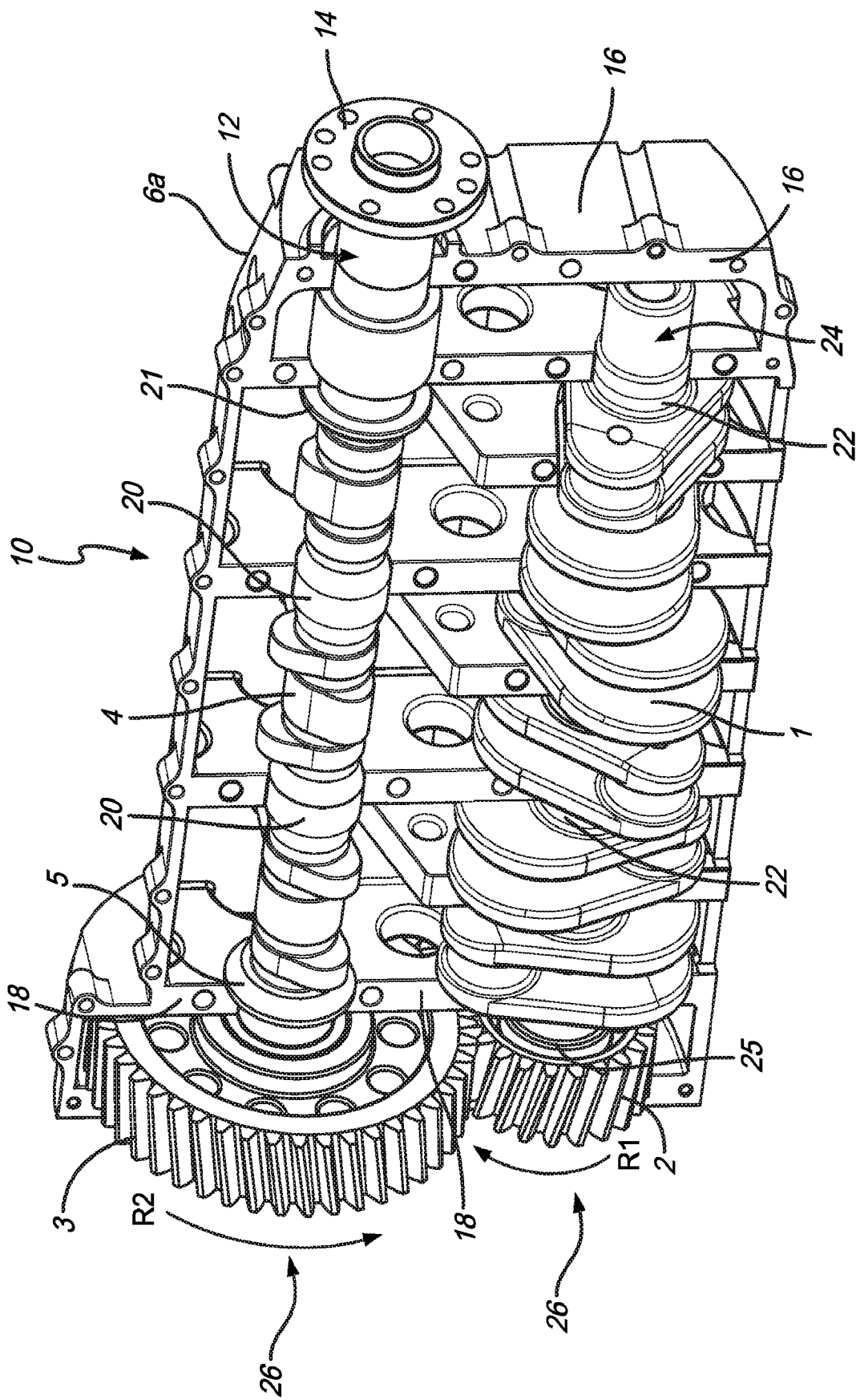
FIG. 2 is a perspective view showing one side of the crankcase assembly of FIG. 1 with the cam drive shaft, crankshaft and drive gear set exposed.
Figure 3:
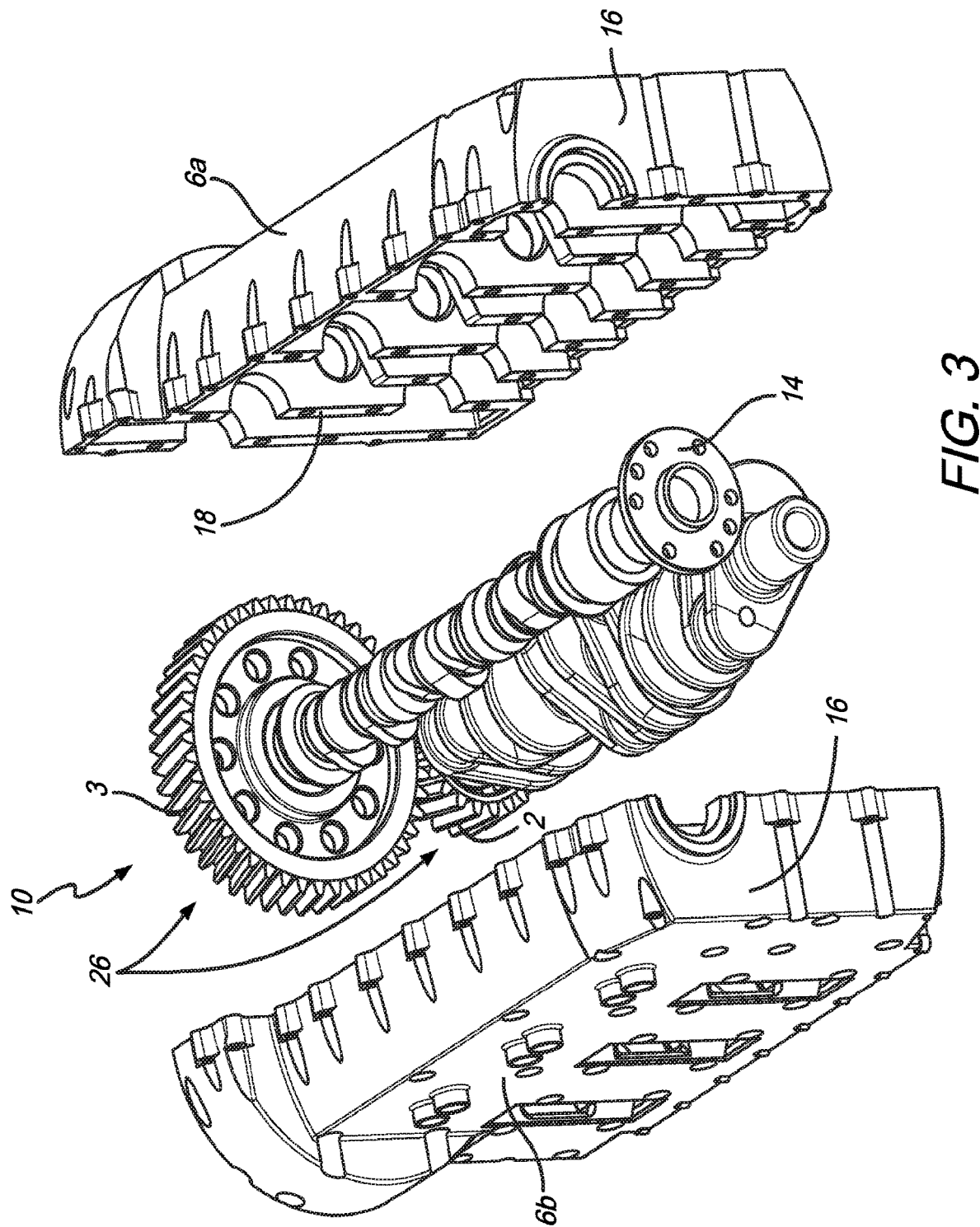
FIG. 3 is an exploded view of the crankcase assembly of FIG. 1.

Referring to FIGS. 1-3, a crankcase assembly 10 is shown for an internal combustion engine for general aviation in accordance with the present invention. The crankcase assembly 10 is configured for use with a six-cylinder "boxer" engine, which has two banks of horizontally opposed pistons (not shown). The crankcase assembly 10 includes a crankcase housing 6 formed by housing sides 6a, 6b. A crankshaft 1 and a camshaft 4 are independently journaled within the crankcase housing 6. The engine is oriented with respect to an aircraft (not shown) so that the crankshaft 1 and the camshaft 4 are each supported for rotation about axes that are generally parallel to the fore-aft axis of the aircraft body.

The camshaft 4 has a forward end 12 with a propeller flange 14 for mounting a propeller (not shown) to the camshaft 4 to provide propulsive thrust for the aircraft when rotated. In this configuration, the camshaft 4 also functions as the output shaft for rotating the propeller. As can be seen in FIG. 2, the camshaft 4 extends aft of the propeller flange 14, through a forward wall 16 and a rearward wall 18 of the crankcase housing 6, and terminates aft of the rearward wall 18. The camshaft 4 is journaled within the crankcase housing 6 by radial bearings 20. A forward thrust bearing 21 is located adjacent the forward wall 16, and an aft thrust bearing 5 is located adjacent the rearward wall 18 to rotatably support and absorb axial thrust applied to the camshaft 4.

Referring to FIGS. 2 and 3, the crankshaft 1 is located below and in the same vertical plane as the camshaft 4. A plurality of radial bearings 22 rotatably support the crankshaft 1 inside the crankcase housing 6. The crankshaft 1 includes a forward end 24, which is located inside crankcase housing 6. The crankshaft 1 extends aft of its forward end 24, through the crankcase housing rearward wall 18, and has a rear end 25 which is aft of the rearward wall 18. The portions of the crankshaft 1 and the camshaft 4 located aft of rearward wall 18 are rotatably coupled to each other to transfer rotational movement from the crankshaft 1 to the camshaft 4. The coupling includes a drive gear set 26, which includes a driving gear 2 fixedly mounted on the crankshaft 1 and a power output gear 3 fixedly mounted on the camshaft 4. The power output gear 3 has a diameter that is twice the diameter of the driving gear 2. The gears of the drive gear set 26 are sized to accommodate the power transmission function. While the power coupling is preferably a gear train, the transfer of rotational power from the crankshaft 1 to the camshaft 4 could also be achieved by a gear and chain or other such arrangement.

In the foregoing configuration, the camshaft 4 functions not only to control the opening and closing of the valves but also to transmit power directly to the propeller at one-half the crankshaft speed. As the pistons rotate the crankshaft 1 and driving gear 2, the power output gear 3 is rotated in a direction opposite that of the driving gear 2. Thus, when the crankshaft 1 rotates clockwise (as viewed from the front) in the direction of arrow R1 it turns the camshaft 4 counterclockwise in the direction of arrow R2 (see FIG. 2). Because the power output gear 3 has a diameter that is twice that of the driving gear 2, the camshaft 4 turns at ½ the speed of the crankshaft 1, thereby providing gear reduction and torque multiplication. Also, the counter rotating crankshaft 1 and camshaft 4, with their respective gears 2, 3, counteract each other and reduce the torque-induced left banking and left turning tendencies in the aircraft.

Figure 4:
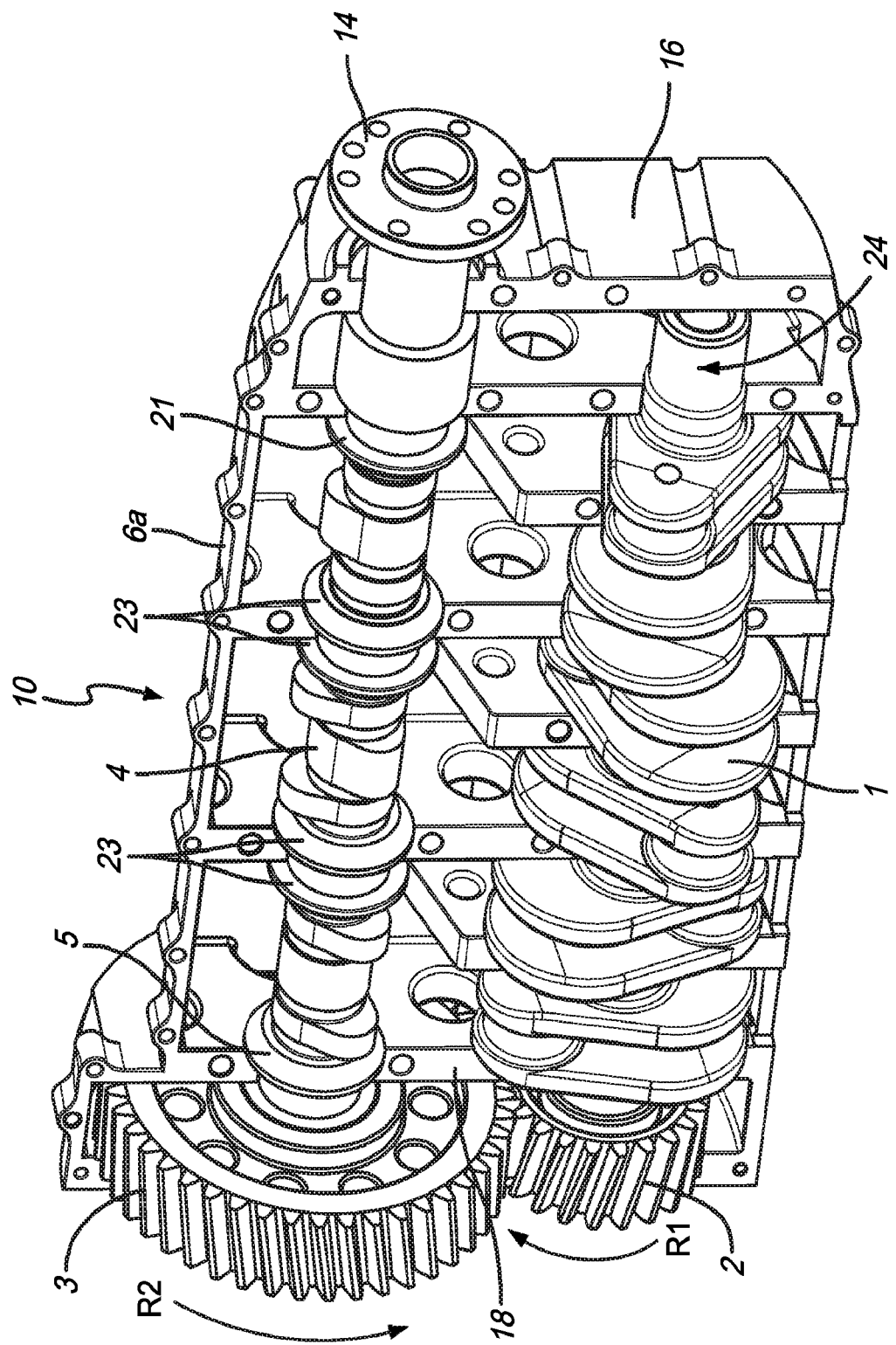
FIG. 4 is a perspective view of one side of another embodiment of a crankcase assembly according to the present invention with the cam drive shaft, crankshaft and drive gear set exposed.

Referring to FIG. 4, another embodiment of a crankcase assembly 10 according to the present invention is similar to that shown in FIGS. 1-3, except that it is provided with additional thrust bearings 23.

An internal combustion engine that utilizes the crankcase assembly 10 of the present invention also will have reduced torsional vibration and will require less frequent maintenance. Because the drive gear set 26 is disposed at the rear of the crankcase housing 6, the power output shaft (which is the camshaft 4 in the embodiments of FIGS. 1-4) can be longer than the propeller shaft of engine configurations that utilize forward gear reduction. As explained below, with this longer power output shaft, the engine can be designed to induce less torsional vibration on the drive train.

Torsional vibration by many accounts is a major factor in the failure of drive train components in internal combustion engines, especially compression ignition engines. Such vibration mainly arises as a result of pressure pulses from the firing in the cylinders acting on the pistons and transmitted by the connecting rods to the crankshaft. A twist in the crankshaft is induced, which then relaxes at the end of the pressure pulses and at beginning of the exhaust strokes. Compression ignition engines operate at higher pressures and can induce more twist, thus greater amplitudes of vibration, than spark ignition engines. Other, albeit lesser, sources of torsional vibration can come from the propeller and accessory drive shafts and components.

Power trains exhibit natural frequencies of vibration, $\omega$, which are directly related to the square root of their stiffness, K, and indirectly related to the square root of their mass moment of inertia, J ($\omega=(K/J)^{0.5}$). Furthermore stiffness, K, is directly related to the area moment of inertia of the shafting, Ip, the modulus of rigidity, G, and inversely related to the length of the shafting, L (K=GIp/L). The dominant harmonic excitation order of an engine is related to the number of cylinders (n in a two-stroke engine and ½ n in a four-stroke engine) and increases with engine rpm. When forced excitation frequencies from the engine torque pulses reach the same frequency as the natural frequencies of the power train, potentially destructive resonance occurs. One can reduce the fundamental mode 1 frequency of the system by increasing the length of the shafting, so that its convergence with the dominant engine harmonic excitation frequency is reached at engine speeds below the higher power operating range of the engine, thereby reducing torsional moments and stresses in the higher power operating range. My simulation studies described below have shown benefit with this approach for engines modeled with greater than four cylinders and even firing orders. Other models with uneven firing orders and different rotating inertias and shaft stiffness may behave differently.

According to one aspect of the present invention, the gear reduction is disposed at the rear of the engine, allowing the entire length of the power output shaft to participate in power transmission. In so doing, the length of the drive train is increased without changing the length of the engine, thereby reducing the natural mode 1 dominant frequency of the power train. This can allow resonance speeds to be reached at rpm's that are below the high speed normal operating range of the engine with a reduction in engine torsional maximum angle displacements, torsional moments, torque reversals and gear hammering and torsional stresses.

Simulation Studies

I have performed comparative simulation studies of torsional vibration on mass elastic models of three opposed boxer six-cylinder engine configurations with gear reduction. These configurations included:
SGRE: an engine configuration utilizing a standard gear reduction
CDSE-FG: an engine configuration utilizing a cam draft shaft with forward gear reduction
CDSE-RG: an engine configuration utilizing a cam drive shaft with rear gear reduction.

The simulation studies compare the performance of one embodiment of a CDSE-RG configuration according to the present invention with the SGRE and CDSE-FG configurations.

The mass elastic models for the simulation studies were constructed and modeled using the torsional vibrational module in Shaft Designer, a modeling program developed by International Maritime Technologies and sold through Svenska Kullagerfabriken (SKF). The engine properties used for these models are shown below in Table 1. The camshaft was also considered to represent dedicated internal drive shafts with 2:1 gear reduction. The engine speed range for the simulations were from 200 to 5000 rpm. The diesel engine gas pressure harmonic

TABLE 1

Figure 5:
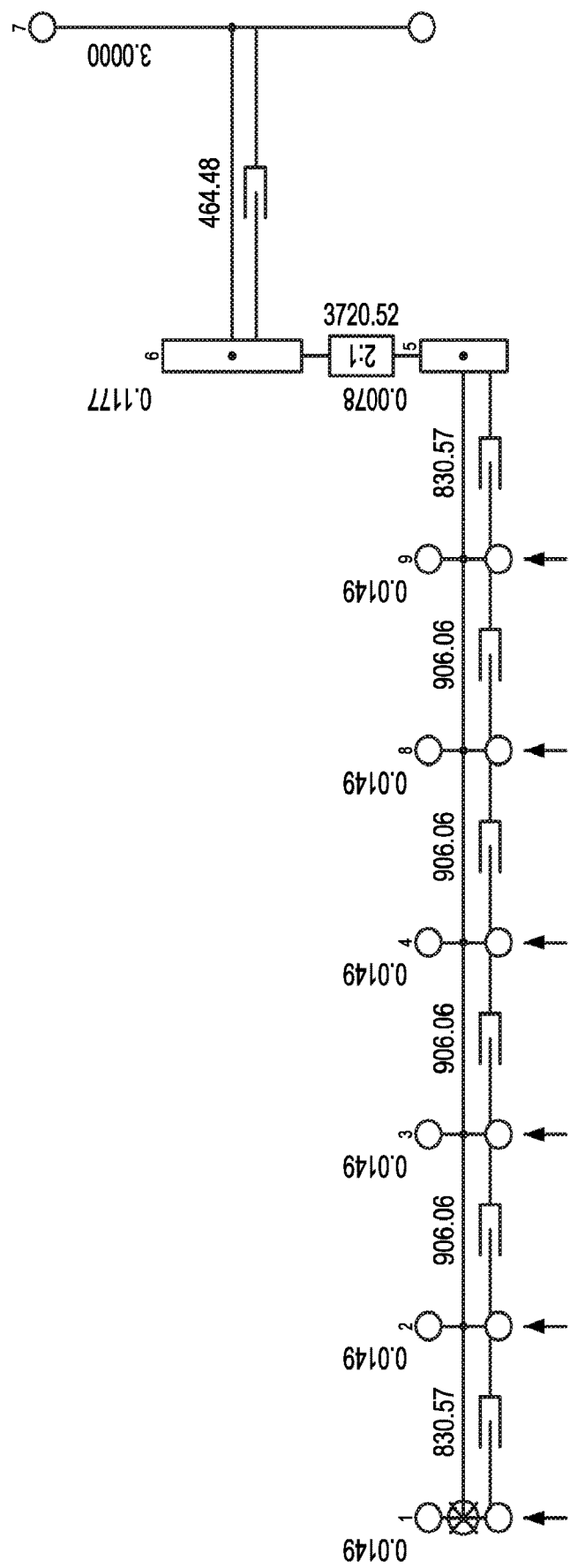
FIG. 5 depicts a mass-elastic model for simulating torsional vibration of a boxer opposed six-cylinder engine with standard gear reduction (SGRE).
Figure 6:
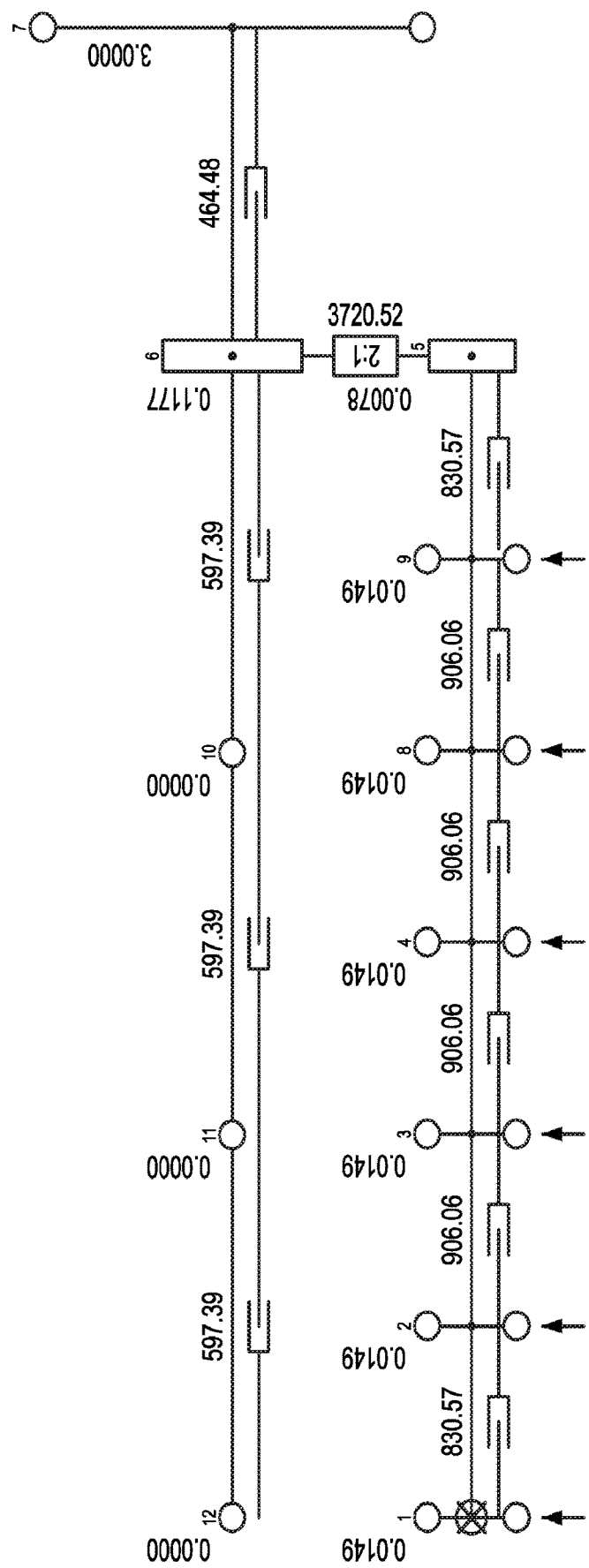
FIG. 6 depicts a mass-elastic model for simulating torsional vibration of a boxer opposed six-cylinder cam/dedicated drive shaft engine with forward gear reduction (CDSE-FG).
Figure 7:
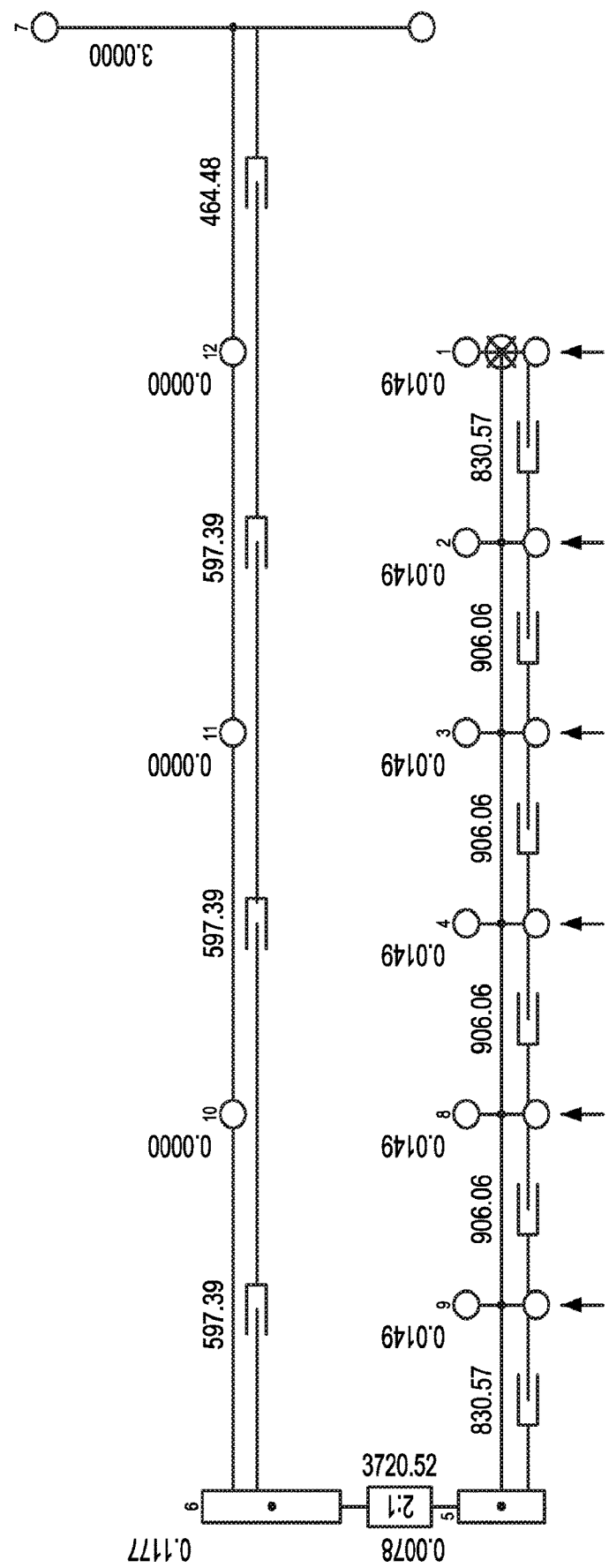
FIG. 7 depicts a mass-elastic model for simulating torsional vibration of a boxer opposed six-cylinder cam/dedicated drive shaft engine with rear gear reduction (CDSE-RG).

| Property | |
|---|---|
| Cylinder Arrangement | Horizontal Opposed Boxer |
| Cylinder Number | 6 |
| Bore & Stroke (mm) | 96 × 105 |
| Displacement (I, in^3) | 4.56, 278 |
| Power (kW, hp) | 236, 316 |
| Rated Speed (RPM) | 3600 |
| Conrod Length (mm) | 164 |
| Reciprocating Mass (kg) per cylinder | 2.72 |
| Rotating Mass (kg) per cylinder | 5.07 |
| Firing Order (A1 at left, at non-driving end) | A1 - B2- A3 - B1- A2 - B3 |
| Firing Angles (deg) | A1 0, B1 360, A2 480, B2 120, A3 240, B3 600 |
| Mean Effective Pressure (bar, psi) | 17.35, 252 |
| Gas Pressure Harmonic Coefficients | Lloyd's Register Excitation Pack | coefficients were obtained from the Lloyd's Register excitation pack and supplied with the software. The propellers were modeled as fixed pitch, 2000 mm diameter with 4 blades and polar mass moments of inertia of 3 kgm^2. Propeller excitation was not enabled and no damping was applied at the propeller. The crankshaft, camshaft, gearing, pistons, piston pins and connecting rods with bolts were modeled using a Solidworks® computer-aided design program marketed by Dassault Systemes Solidworks Corp. Polar mass moments of inertia and component dimensions were obtained from the modeled components in the Solidworks® program. Where available, component dimensions were based on tables of diesel engine component sizes from Taylor, C. F., 1985, The Internal Combustion Engine in Theory and Practice: Volume 2, Second Edition Revised, MIT Press, pp. 460-469. Camshaft section stiffness was calculated from area polar moments of inertia based on shaft section internal and external diameters, lengths and modulus of rigidity. Crankshaft section stiffness was calculated from area polar moments of inertia based on equivalent solid shaft lengths of main journal diameter calculated according to Ker Wilson, W., 1956, Practical Solution of Torsional Vibration Problems, Volume 1, Wiley, pp. 593-613, and modulus of rigidity. Good agreement has been found for the determination of crankshaft segment stiffness between finite element analysis using ANSYS and the Ker Wilson formula with mean relative error analyzing two different crankshaft segment models of 3.2% from Feese, T. and Hill, C., 2009, "Prevention of Torsional Vibration Problems in Reciprocating Machinery", Proceedings of the Twenty-Eighth Turbomachinery Symposium, pp. 213-238. Gear stiffness was calculated using formulas from Nestorides, E. J., 1958, A Handbook on Torsional Vibration, Cambridge University Press, pp. 81-91. All damping was modeled as frequency dependent internal damping and assigned as 1.59% of critical damping based on Corbo, M. and Malanoski, S. B., 1996, "Practical Design Against Torsional Vibration", Proceedings of the Twenty-Fifth Turbomachinery Symposium, pp. 189-222, and Wachel, J. C. and Szenasi, F. R., 1993, "Analysis of Torsional Vibration in Rotating Machinery", Proceedings of the Twenty Second Turbomachinery Symposium, pp. 127-152. FIGS. 5-7 show the mass-elastic models for the SGRE, CDSE-FG and CDSE-RG configurations, respectively. The models use lumped masses having specific inertias connected by massless stiffness elements. The horizontal numbers on the shaft elements are stiffness in kNm/rad. The vertical numbers are polar moments of inertia of the rotating masses at the crankshaft (crank cheeks with intervening shaft segments, crankpins, big end of the connecting rods and bolts), gears and propeller in kgm^2. The camshafts in the CDSE-FG and CDSE-RG models are divided into three segments by nodes representing placement of bearings. The lower shafts in each case represent the crankshafts attached to the pinion gears. In the SGRE model, the pinion gear meshes with the driven gear that is connected to the propeller shaft. In the CDSE-FG model, the driven gear is connected to both the propeller shaft and the camshaft. In the CDSE-RG model, the driven gear is attached such that the entire camshaft is involved in power transmission terminating with the last segment connecting with the propeller shaft. Power transmission was assigned as 100% to the propeller in all three models. Gear reduction is 2:1 for all three models. The vertical arrows indicate components that are involved in forced excitation. The horizontal dashpots indicate internal damping.

Vibration Modes and Natural Frequencies

Table 2 below shows a comparison of the undamped natural frequencies for the different vibration modes of the SGRE, CDSE-FG and CDSE-RG models. The modes 1 to 8 natural frequencies for SGRE and CDSE-FG were identical. The first mode natural frequency of the CDSE-RG model was significantly

TABLE 2

| Mode | SGRE | CDSE-FG | CDSE-RG |
|---|---|---|---|
| 1 | 150 | 150 | 88 |
| 2 | 501 | 501 | 474 |
| 3 | 945 | 945 | 938 |
| 4 | 1402 | 1402 | 1401 |
| 5 | 1823 | 1823 | 1823 |
| 6 | 2169 | 2169 | 2169 |
| 7 | 2400 | 2400 | 2400 |
| 8 | 4210 | 4210 | 4209 |
| 9 | | 2.32E^27 | 3.30E^27 |
| 10 | | 6.34E^27 | 6.34E^27 |
| 11 | | 8.65E^27 | 8.33E^27 | lower at 88 Hz while all of the remaining mode frequencies were the same or nearly the same as in the CDSE-FG model. The reduction in natural frequency in the CDSE-RG configuration is not based on greater constraint of the propeller shaft but is instead based on a reduction of the mode 1 natural frequency of the system with the increase in power train length. The mode 1 frequency shape is described as a vibration of the entire power train length in one continuous mode and is the lowest frequency. The remaining modes are vibrations that include progressively more engine nodes where the vibrations pass with zero vibration and change sign with progressively higher frequencies as more nodes are included in the increasing modes.

Campbell Diagrams

Figure 8:
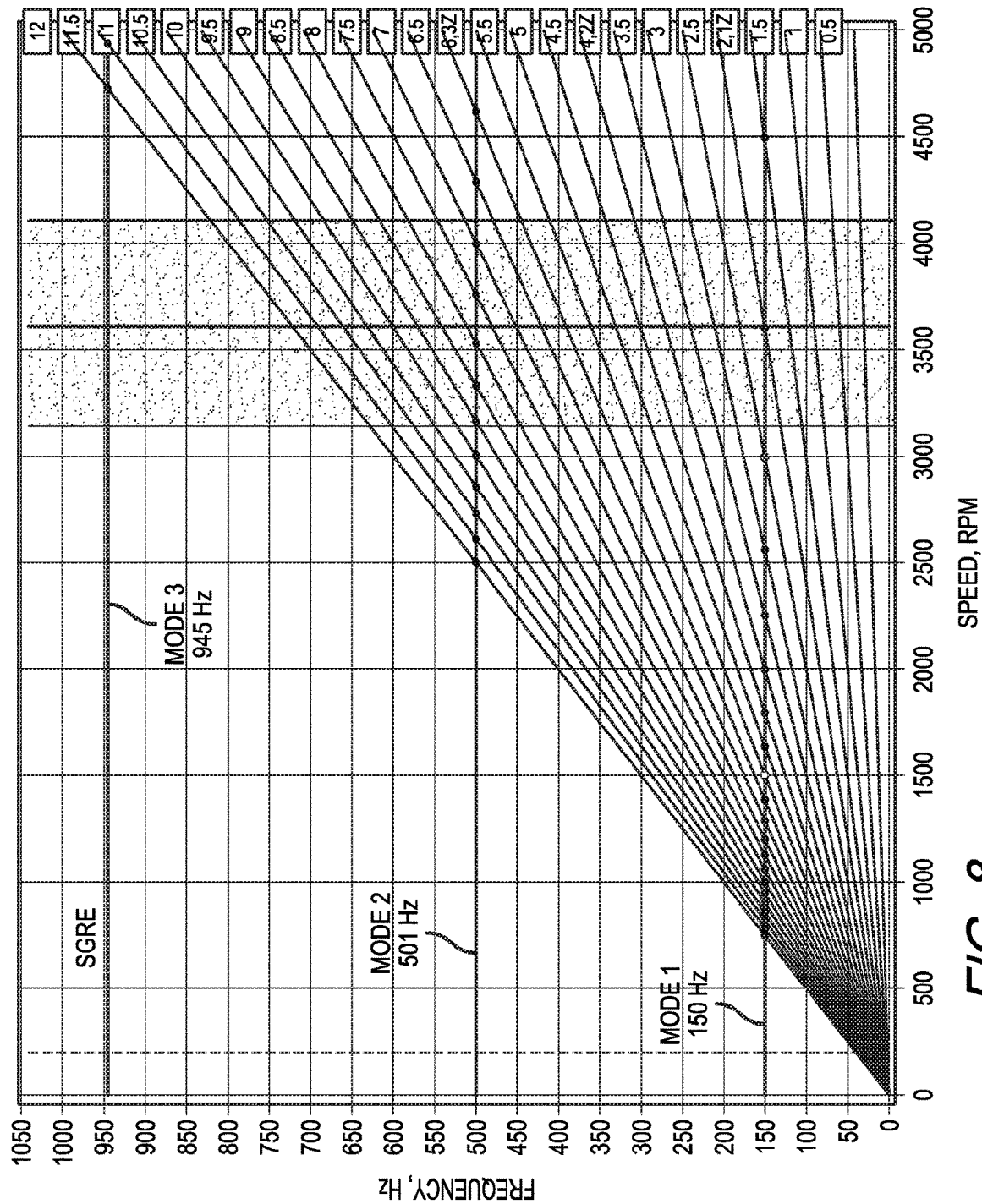
FIG. 8 is a Campbell (interference) diagram for the SGRE model of FIG. 5, which shows the forced excitation frequencies for the engine configuration as a function of the engine rotation speed.
Figure 9:
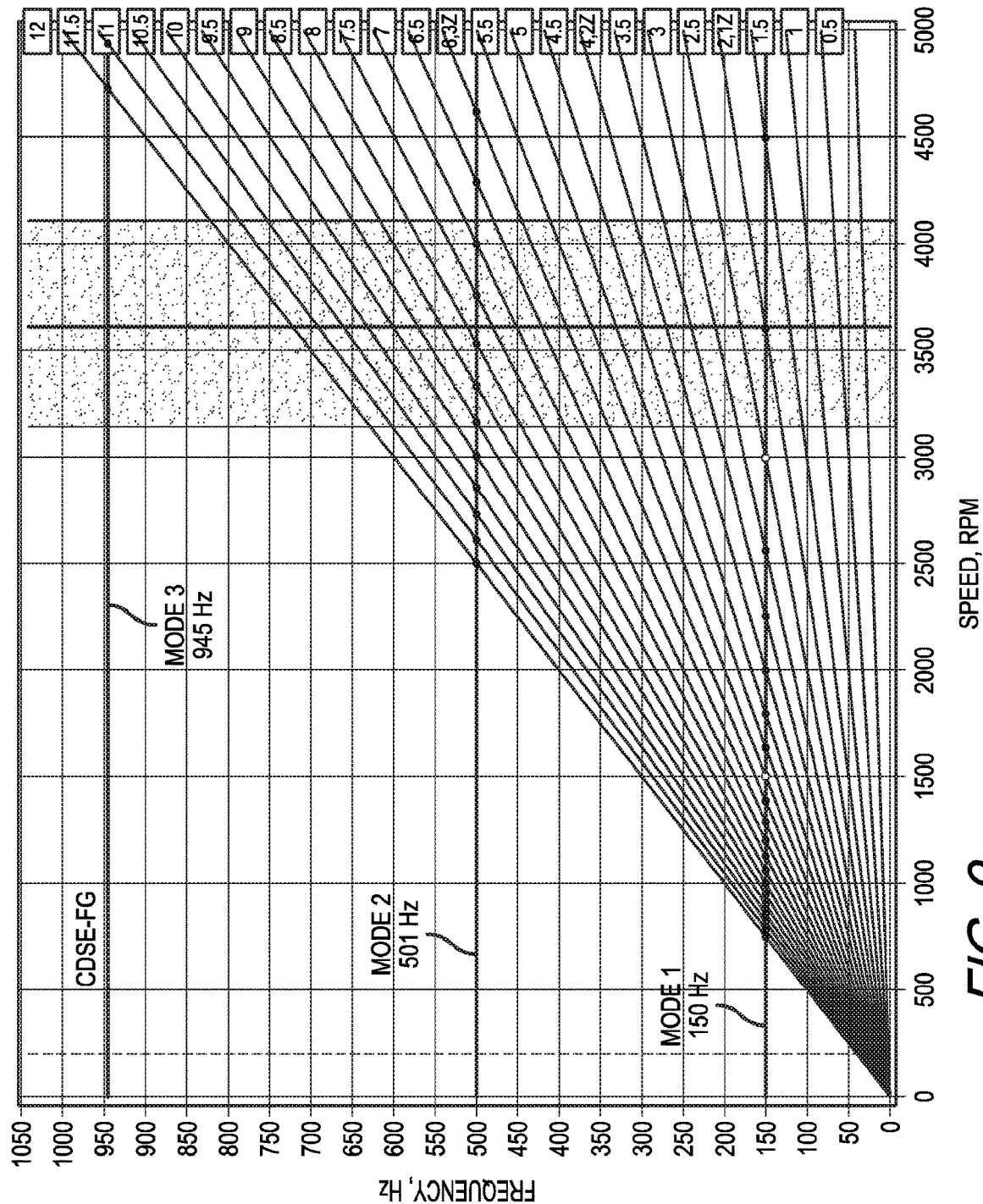
FIG. 9 is a Campbell (interference) diagram for the CDSE-FG model of FIG. 6.
Figure 10:
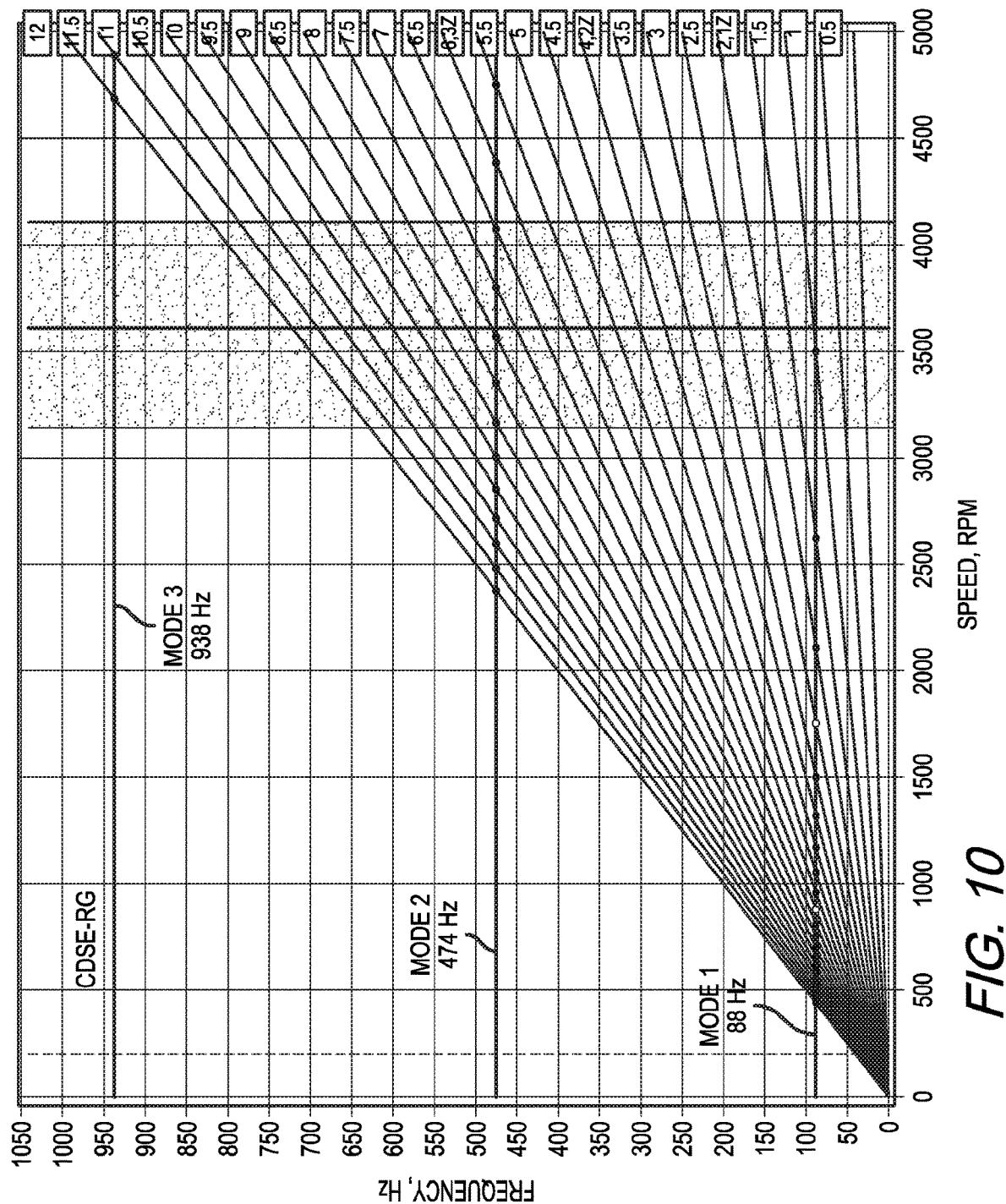
FIG. 10 is a Campbell (interference) diagram for the CDSE-RG model of FIG. 7.

FIGS. 8-10 are Campbell (interference) diagrams for the SGRE, CDSE-FG and CDSE-RG models, respectively, which show the forced excitation frequencies as a function of the engine rotation speed for each engine configuration. The bold horizontal lines show the power train natural frequencies. The diagonal lines are the forced engine harmonic excitation frequencies as a function of rpm with their respective order numbers appearing above the diagonals. The bold diagonals show the orders in reference to the propeller speed, which is at half the engine speed as Z orders. The intersection points shown as light dots are the significant resonance speeds. The shaded areas represent the area bounded by 0.87 and 1.14 times the maximum continuous rating (MCR). The dashed vertical lines indicate the lowest simulated engine speeds (200 rpm).

Convergence of Harmonic Forced Excitation Frequencies with Undamped Natural Frequencies Referring to FIGS. 8-10, the diagonal lines trace the increases in frequencies for each numbered engine harmonic as a function of rpm. Table 2 lists the 8 natural frequencies in the SGRE model and the 11 in the CDSE-FG and CDSE-RG models. Only the first three natural frequencies arise and are plotted on the Campbell diagrams over the selected speed range and only the first mode natural frequency proved to be significant in the engine speed range up to the MCR. The convergence points of the diagonal engine harmonic excitation frequencies with the horizontal natural frequencies are indicated as dark and light dots. There are 24 engine harmonic excitation frequencies in the models with 35 resonance points (dark and light dots) shown in the SGRE and CDSE-FG models and 37 in the CDSE-RG model. Two significant resonance speeds are considered in the models involving the convergence of the 3rd and 6th order engine harmonics with the mode 1 natural frequencies. They are the light dots in the Campbell diagrams. The dominant excitation frequency expected in a 6 cylinder 4-stroke engine is 3rd order or 3 times per shaft revolution and this was borne out in the simulation studies to follow. The 3rd order harmonic frequency converged with first mode natural frequency (150 Hz) at 3,002 rpm in both the SGRE and CDSE-FG models and converged with the first mode natural frequency (88 Hz) at 1,755 rpm in the CDSE-RG model. The 6th order harmonic converged with the first mode natural frequency (150 Hz) at an engine speed of 1,501 rpm in the SGRE and CDSE-FG models and with the first mode natural frequency (88 Hz) at 878 rpm in the CDSE-RG model.

With the CDSE-RG model, the convergence of the dominant engine harmonic excitation frequencies and the mode 1 natural frequency are at lower speeds than the SGRE and CDSE-FG configurations and occurs out of the high speed normal operating range of the engine, resulting in lower torsional maximum angle displacements, torsional moments, reduced gear hammering due to high amplitude torque reversals and reduced torsional stress in the normal operating range. With the CDSE-RG configuration, the torsional moments in the high speed normal operating range (3000 to 3600 rpm) are quite low and are even below the mean torques. The peak torsional stresses at the propeller shaft are about 5-6 fold less than for the SGRE and CDSE-FG (about 23 fold less than the Ultimate Tensile Strength ("UTS") for 4340 steel and are away from the high speed normal engine operating range. The stresses in the high speed normal operating range are about 18 fold less than for the SGRE and CDSE-FG configurations and are about 70 times less than the UTS for 4340 steel and in the range desired for indefinite fatigue life.

Torsional Maximum Angle Deflections

Figure 11:
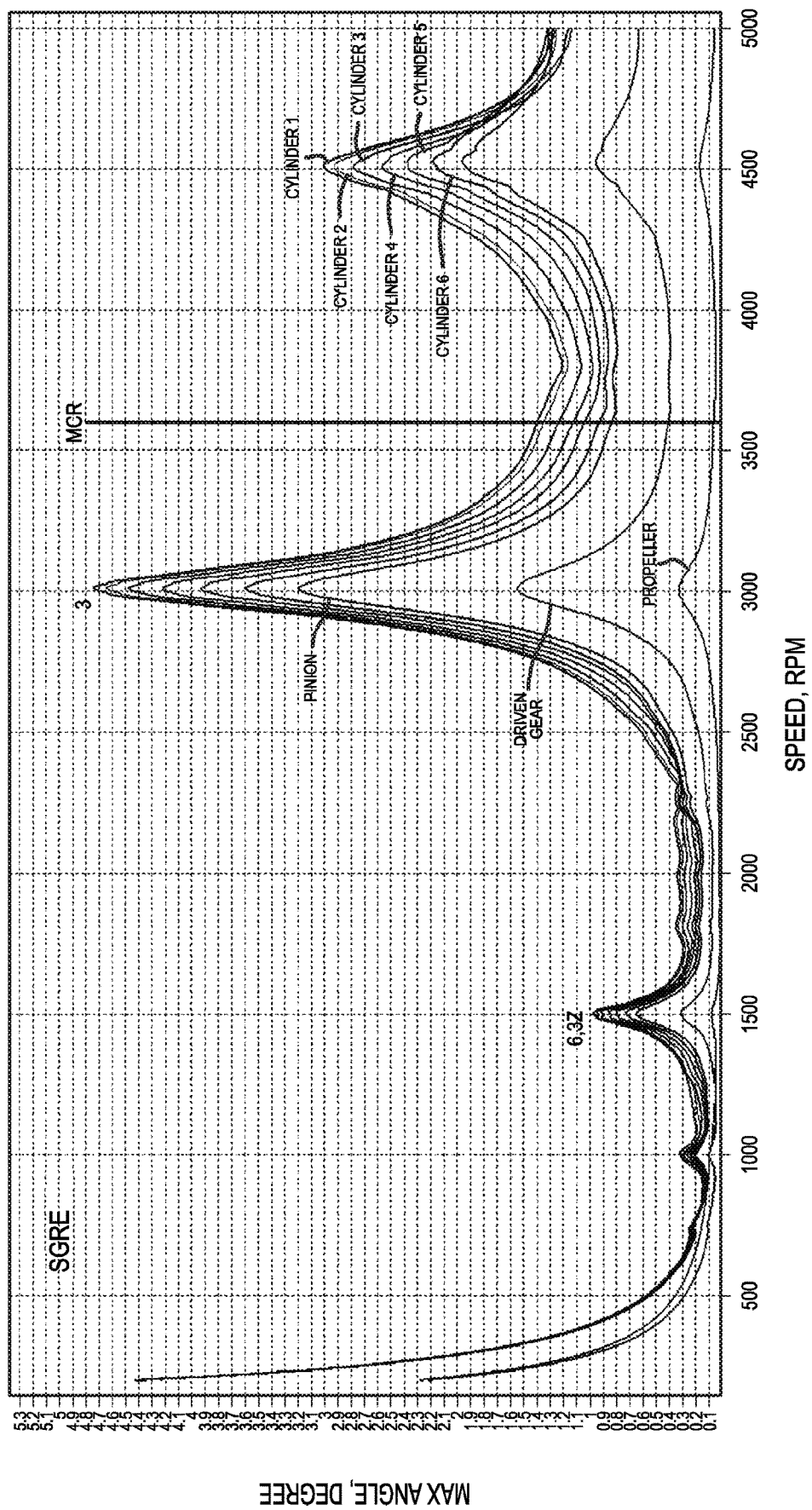
FIG. 11 is a graph showing the torsional maximum angle deflections at the powertrain nodes for each of the engine components in the SGRE model as a function of rpm.
Figure 12:
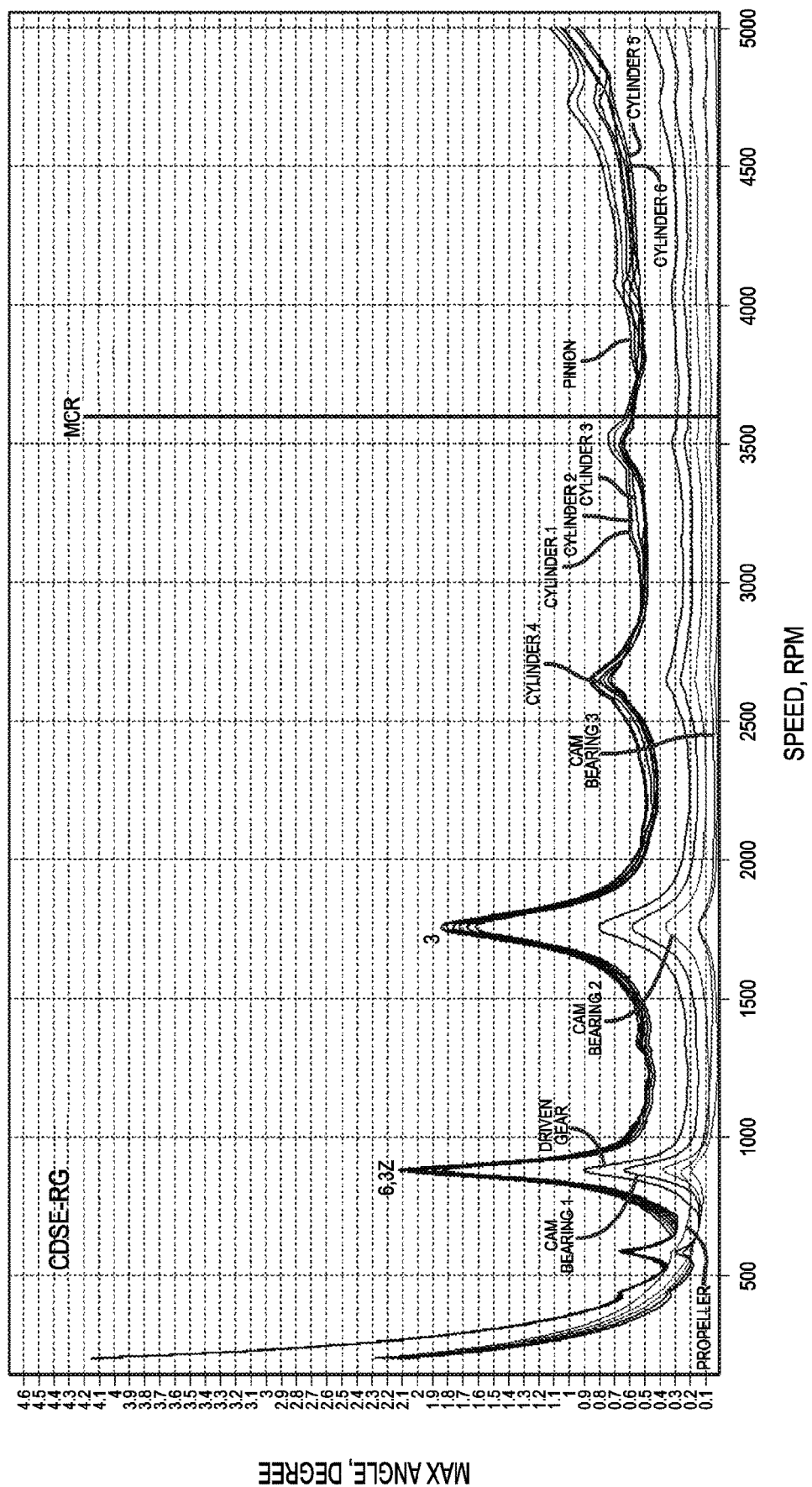
FIG. 12 is a graph showing the torsional maximum angle deflections at the powertrain nodes for each of the engine components in the CDSE-RG model as a function of rpm.

FIGS. 11 and 12 show the maximum angle deflections at the powertrain nodes for each of the engine components in the SGRE and CDSE-RG models, respectively, as a function of rpm. Note that there is a small difference between the y-axis scales for each of the models. The legend on the right of each graph references the curves of the different engine components. The lowest curves in the graphs are for the propeller. The overlying curves with increasing deflection in the SGRE model (FIG. 11) are the driven gear and the individually identified curves for the pinion and cylinders 6 through 1. In the CDSE-RG model (FIG. 12), the overlying curves are for camshaft bearings 3, 2, 1, driven gear and the closely grouped pinion and cylinders 6 through 1. The significant peaks in both models are at the 3rd and 6th engine excitation harmonics interacting with the first mode natural frequencies. The CDSE-FG model behaved exactly as the SGRE model and its data are not shown here or in the remainder of the presented simulations.

Comparing FIGS. 11 and 12 reveals that, with the CDSE-RG model, there is an amplitude reduction in the 3rd and 6th order peaks and a translation of those peaks to lower speeds. Large deflections occurred at engine speeds less than 400 rpm in all the models due almost entirely to 3rd order engine harmonics. In the SGRE model (FIG. 11), within the 400 to 3600 rpm engine speed range, the largest deflections occurred at the resonance speed involving the 3rd order harmonic at 3,012 rpm. The lowest curves, indicating the lowest deflections at the different engine nodes, were seen at the propeller with increasing deflection with retrograde progression up the drive train with the highest deflection indicated at cylinder 1 at 4.8 degrees.

In the CDSE-RG model (FIG. 12), the peak associated with the 3rd order harmonic was shifted to 1752 rpm with the highest deflection at cylinder 1 at 1.8 degrees. The peak torsional deflection for the resonance associated with the 6th order harmonic was at 1,502 for the SGRE model with maximum deflection at cylinder 1 at 1.0 degree. The peak torsional deflection associated with the 6th order harmonic was shifted to 878 rpm with an increase in cylinder 1 deflection to 2.1 degrees for the CDSE-RG model. The maximum deflection in the camshaft in the CDSE-RG model between 400 and 3600 rpm was at camshaft bearing 1 and was 0.6 degrees at 878 rpm. This was due primarily to resonance induced by the 6th order harmonic.

Torsional Stress

Figure 13:
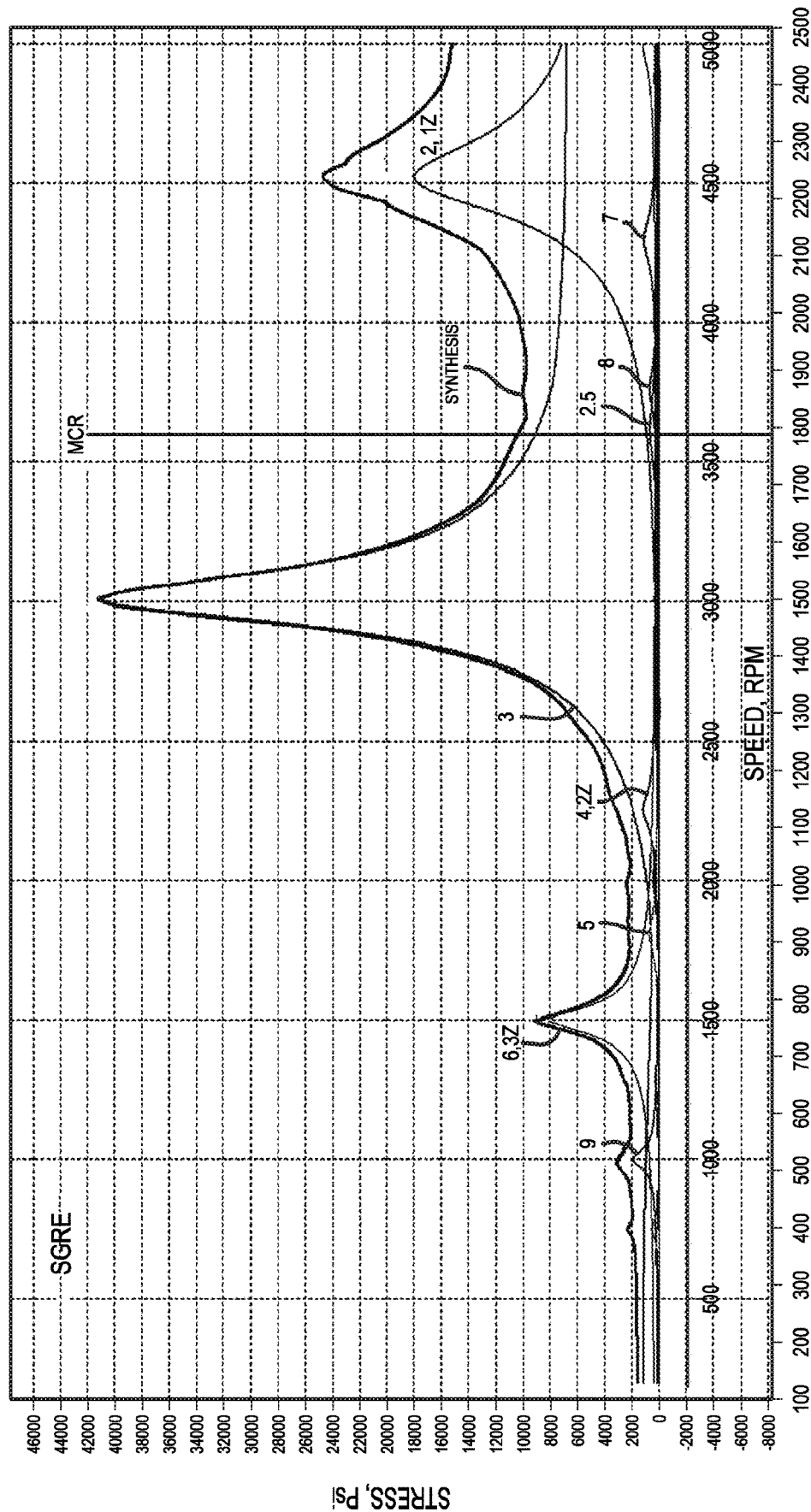
FIG. 13 is a graph showing the propeller shaft torsional maximum stress as a function of rpm and harmonic order for the SGRE model.
Figure 14:
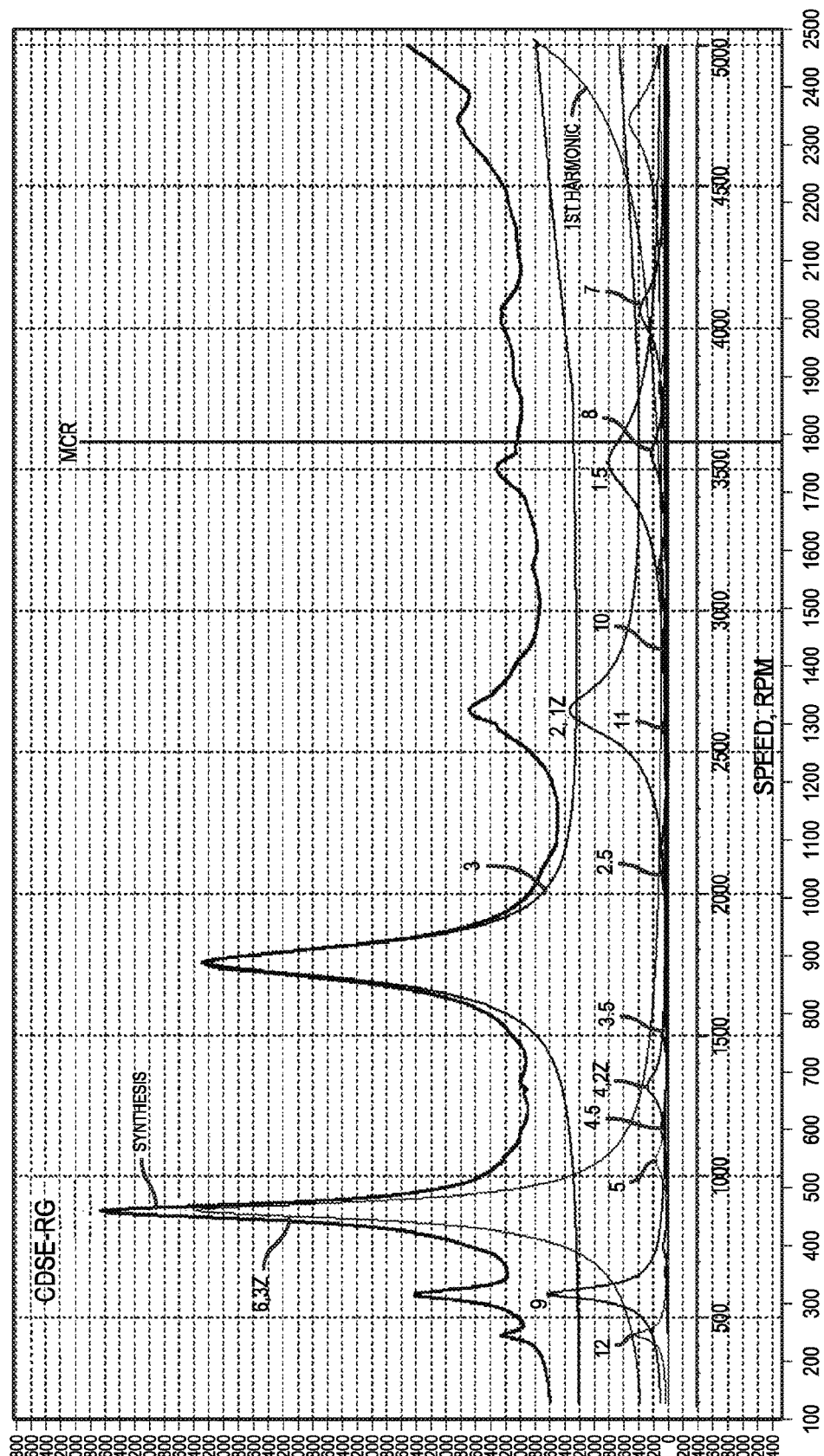
FIG. 14 is a graph showing the propeller shaft torsional maximum stress as a function of rpm and harmonic order for the CDSE-RG model.

FIGS. 13 and 14 show the propeller shaft torsional stress as a function of rpm and harmonic order for the SGRE and CDSE-RG models, respectively. The lower rpm scale is the propeller speed and the upper rpm scale the engine speed. The harmonic orders are referenced in the legends on the right. Torsional stress (psi) is on the y-axis. Note that the y-axis scale for the CDSE-RG model is much lower than the scale for the SGRE model. The top bold solid lines are synthesis of the stresses of all the harmonics. The major stress peaks are associated with the 3rd and 6th harmonics in both models. In the CDSE-RG model, as compared to the SGRE model, there is a significant the reduction in amplitude of the 3rd and 6th harmonic stress peaks and their translation to lower speeds.

In the SGRE model (FIG. 13), the stress associated with the dominant 3rd order harmonic prevails and occurs at 3,012 rpm. This is followed far behind by the stress associated with the 6th order harmonic at 1,506 rpm. By comparison, in the CDSE-RG model (FIG. 14), the peak stresses for these excitation harmonics in each case are displaced to lower rpm, 1,758 rpm and 878 rpm respectively and are associated with marked reductions in torsional stress. The largest reduction occurred with the dominant 3rd order harmonic peak going from 41,132 psi in the propeller shaft of SGRE model to 6,227 psi in the CDSE-RG model. The peak stress associated with the 6th order harmonic was 8,642 psi in the SGRE model that fell slightly to 7,625 psi for the CDSE-RG model.

Figure 15:
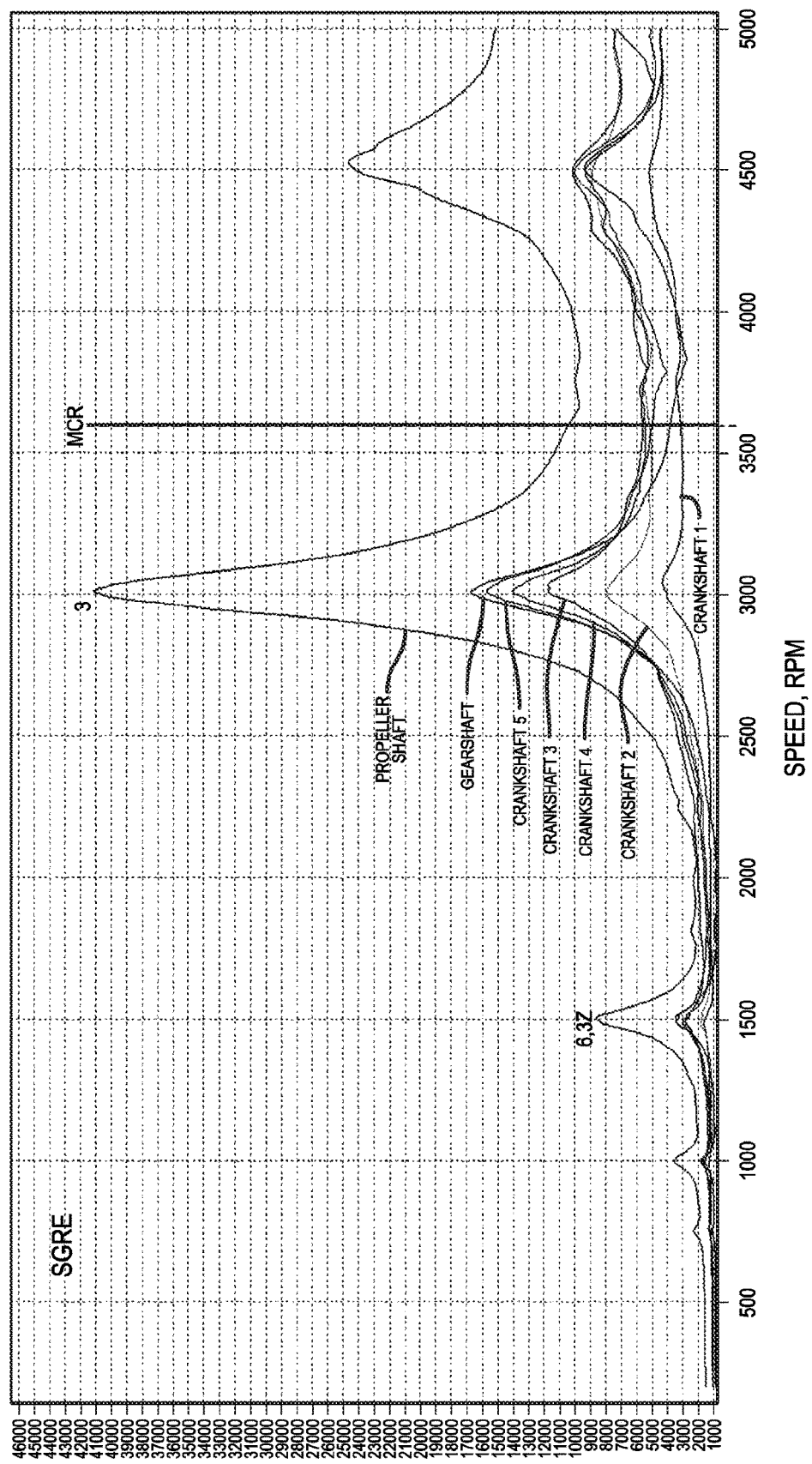
FIG. 15 is a graph showing the torsional maximum stress for each engine shaft segment as a function of rpm for the SGRE model.
Figure 16:
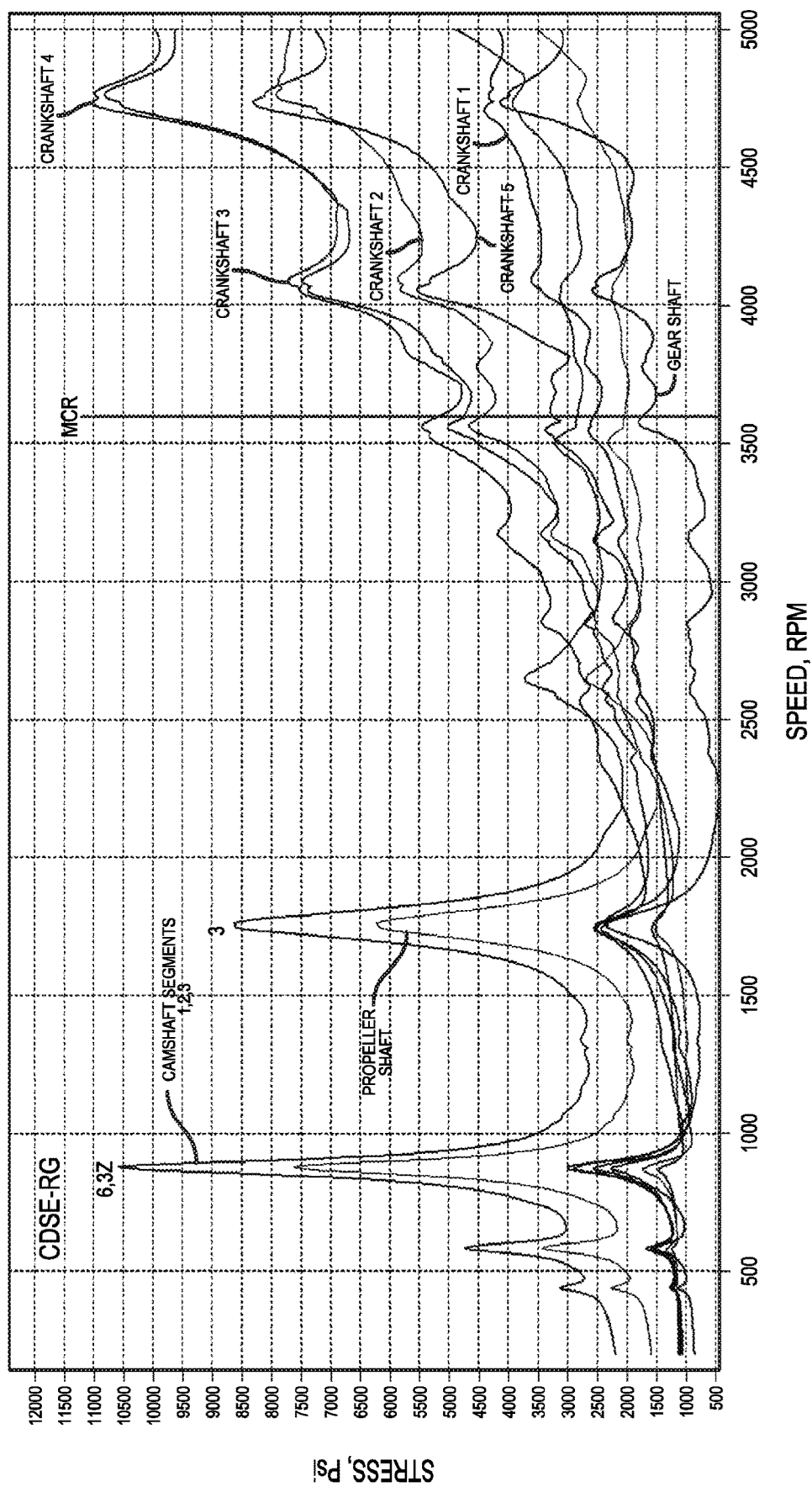
FIG. 16 is a graph showing the torsional maximum stress for each engine shaft segment as a function of rpm for the CDSE-RG model.

FIGS. 15 and 16 show the torsional stress for each engine shaft segment as a function of rpm for the SGRE and CDSE-RG models, respectively. The legends on the right reference the curves for the different shaft segments. Note the difference in the y-axis scaling for the CDSE-RG model. The dominant stress peaks up to the MCR are associated with the 3rd and 6th order harmonics. In the SGRE model (FIG. 15), the peak stresses are most at the propeller shaft followed by the gear shaft with successively lower stresses in the crankshaft elements retrograde up the drivetrain. In the CDSE-RG model (FIG. 16), the peak stresses are with the camshaft segments 3, 2 and 1 which are identical and superimposed followed by successively lower stresses in the propeller shaft, gear shaft and crankshaft elements retrograde up the powertrain.

In the CDSE-RG model (FIG. 16), the maximum stresses are markedly reduced and are translated to lower rpm compared with those of the SGRE model (FIG. 15). The maximum shaft segment stresses in CDSE-RG model however are now in the camshaft segments rather than the propeller shaft. The peak stresses in the camshaft segments were 8,647 psi associated with the 3rd order harmonic and 10,590 psi with the 6th order harmonic. Thus, the stress associated with the 6th order harmonic becomes the dominant stress in the CDSE-RG model in speeds up to the MCR. Beyond the resonance speeds, it is noteworthy that the gear shaft, camshaft and propeller shaft segment stresses remain relatively stable. The crankshaft segment stresses, however, increase steadily to the MCR and beyond; although, at the MCR they still remain below the peak camshaft and propeller shaft stresses.

Torsional Moments and Potential Gear Hammering

Figure 17:
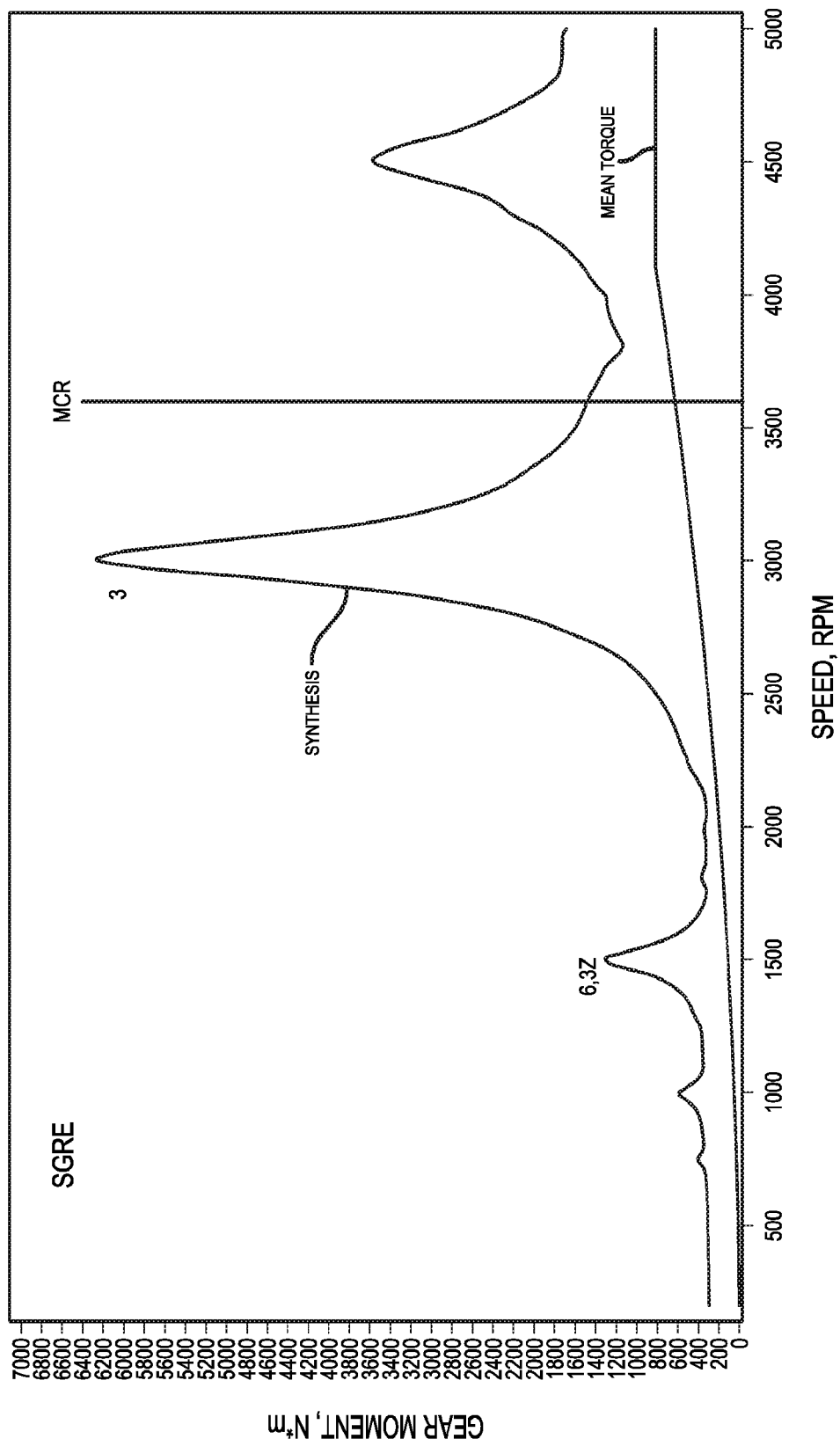
FIG. 17 is a graph showing the gear coupling torsional moments in the SGRE model.
Figure 18:
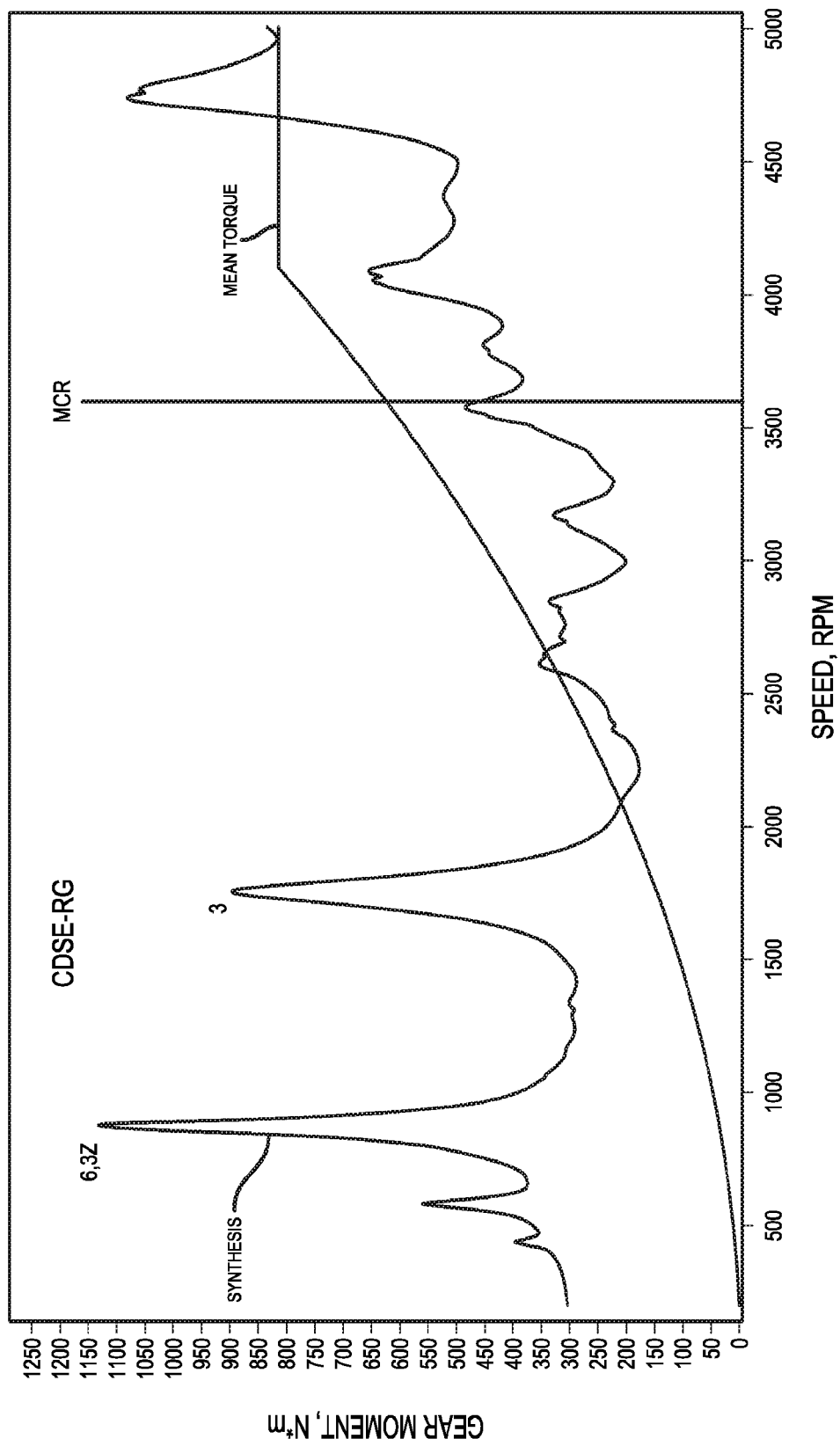
FIG. 18 is a graph showing the gear coupling torsional moments in the CDSE-RG model.

FIGS. 17 and 18 show the gear coupling torsional moments in the SGRE and CDSE-RG models, respectively. Gear moment is on the y-axis. Note that there is a difference in y-axis scale for the CDSE-RG model. Each of the figures includes a curve representing the synthesis of the moments for all the engine harmonic excitations as a function of rpm as well as a curve representing the mean engine torque. The positions of the 3rd order and 6th order harmonic associated moment peaks are indicated in each figure.

In the SGRE model (FIG. 17), the significant torsional moment up to the MCR was associated with the dominant 3rd order harmonic peak, 6,278 Nm at 3,006 rpm followed by the moment associated with the 6th order harmonic peak, 1,317 Nm at 1,506 rpm. By comparison, in the CDSE-RG model (FIG. 18), the peak torsional moments are translated to lower rpm and reduced in amplitude. The major reduction occurs at the 3rd order harmonic to 896 Nm at 1,755 rpm with lesser reduction at the 6th to 1,138 Nm at 878 rpm.

Figure 19:
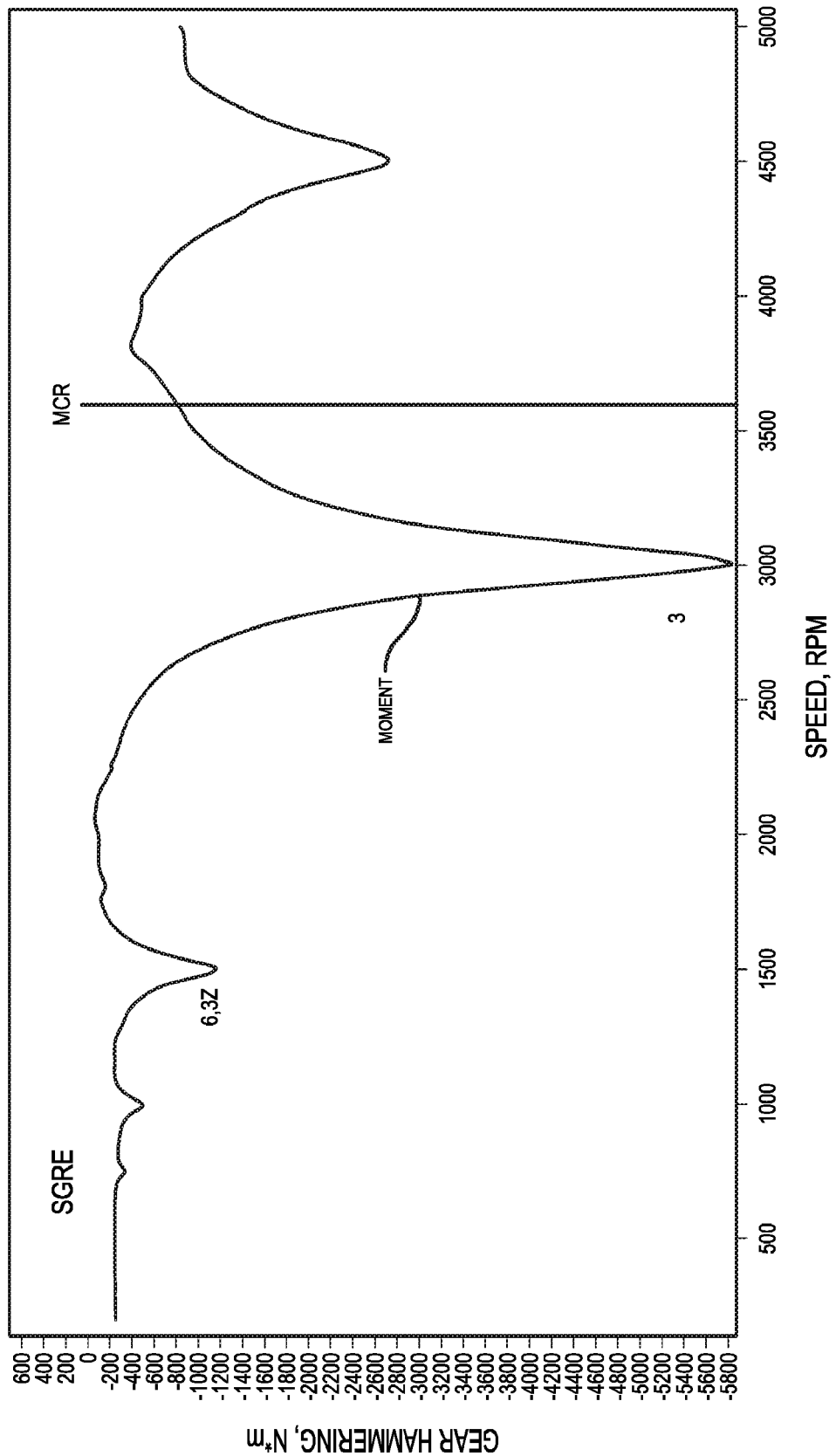
FIG. 19 is a graph showing gear hammering potential of the SGRE model.
Figure 20:
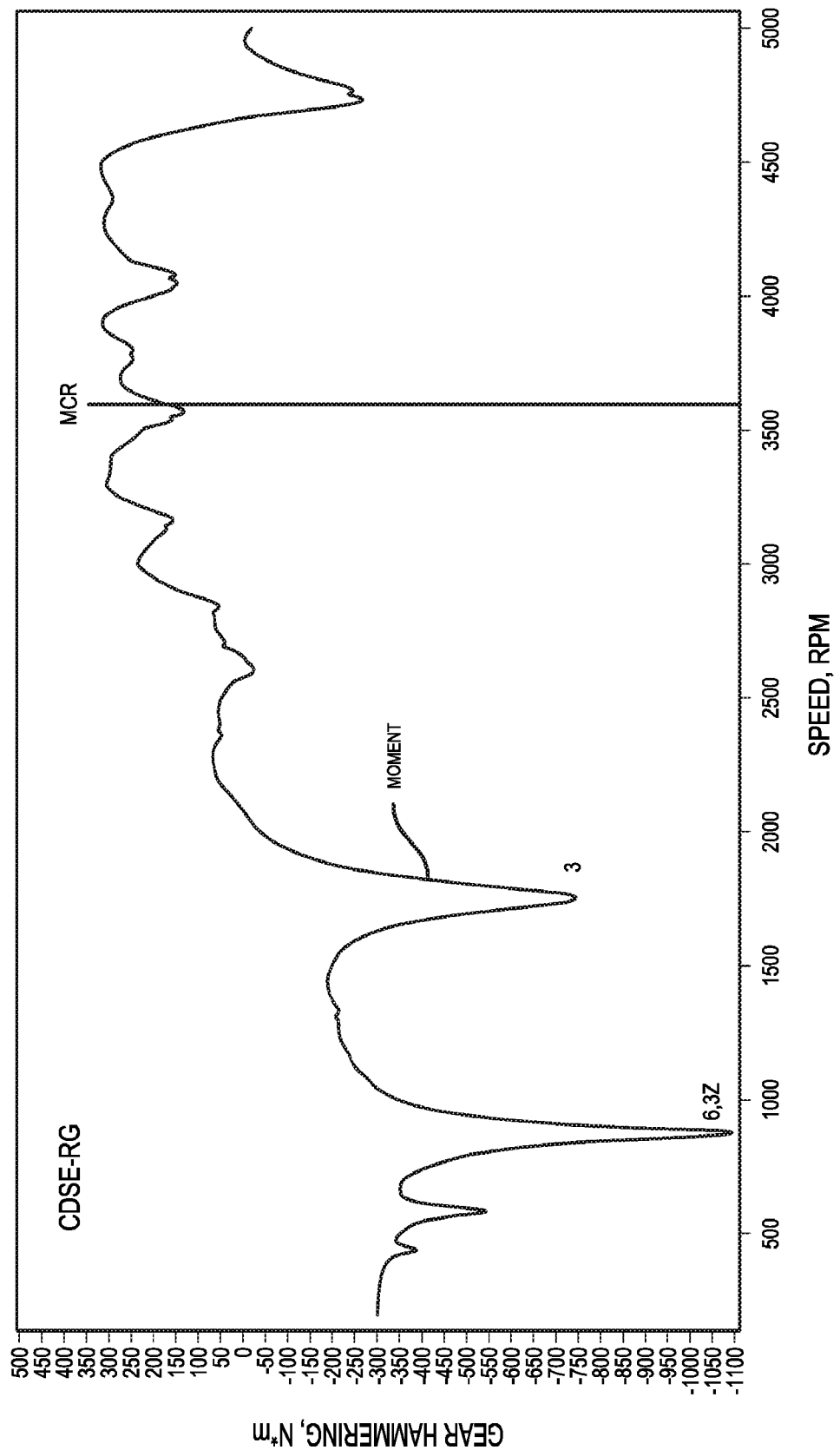
FIG. 20 is a graph showing gear hammering potential of the CDSE-RG model.

FIGS. 19 and 20 show gear hammering potential of the SGRE and CDSE-RG models, respectively. The moments associated with the potential for gear hammering arise when the vibratory moment is greater than the mean engine torque. They are calculated as the difference between the mean engine torque and the vibratory moment. Note the difference in the y-axis scaling between the SGRE model (FIG. 19) and the CDSE-RG model (FIG. 20). Note also that the moments for potential gear hammering in the CDSE-RG model compared with the SGRE model are reduced and translated to lower speed.

As shown in FIG. 19, significant potential for gear hammering was seen in the SGRE model and was associated with the 3rd order harmonic peaking at −5,842 Nm at 3,006 rpm followed by the moment associated with the 6th order harmonic peaking at −1,277 Nm at 1,504 rpm. By comparison, in the CDSE-RG model (FIG. 20), the peak moments are translated to lower rpm and reduced in amplitude. The major reduction in amplitude occurs at the 3rd order harmonic peak to −747 Nm at 1,754 rpm with lesser reduction at the 6th to −1,101 Nm at 878 rpm.

CONCLUSIONS

The preceding simulation studies demonstrate marked reduction in torsional vibration in an engine according to the present invention having an increased powertrain length with power transmission through the camshaft or a dedicated internal drive shaft, such as the CDSE-RG configuration shown in FIGS. 1-3.

One of the concerns about using the camshaft for power transmission is that torsional displacements in the camshaft would interfere with the timing in the opening and closing of the poppet valves. It is noteworthy, however, that the maximum torsional deflection in the camshaft in the CDSE-RG model occurred at camshaft bearing 1 and was 0.6 degrees at 878 rpm due to resonance associated with the 6th order harmonic. This suggests that torsional deflection of the camshaft is not likely to be a significant problem with engines of the CDSE-RG design.

Torsional stresses in the SGRE and CDSE-FG models were quite high and occurred in what would be expected to be the normal cruise operating range for the engine as used in general aviation. By contrast, in the CDSE-RG model, the dominant 3rd order associated stresses are not only reduced greater than six-fold, they are displaced to lower rpm out of the normal cruise operating range where operations would be expected to be transient or transitory.

Gear hammering is likely a significant issue contributing to gearbox and accessory drive problems in aviation diesel engines. Significant potential for gear hammering was seen in the SGRE and CDSE-FG models due to interaction of the 3rd order engine excitation harmonics with the first mode natural frequency at 3,006 rpm that was −5,842 Nm. The absolute value of this amplitude is greater than 9 times the mean maximum engine torque at the MCR. In the CDSE-RG model, this resonance speed was translated to 1,754 rpm with a major reduction in amplitude of the potential gear hammering moments to −747 Nm with an absolute value amplitude a little higher than the mean torque of the engine at the MCR.

The features of the present invention that provide reduction of the dominant mode 1 power train natural frequency with resultant reduction in torsional vibration by using the cam shaft for power transmission can also be applied to engine configurations that utilize a geared dedicated shaft to provide speed reduction and power transmission to the propeller. Such engine configurations would be useful in applications that should not be constrained by the 2/1 engine to camshaft speed, in engines employing overhead camshafts and for any other reason that using the camshaft as a drive shaft may not be desired.

The simulation studies show that power transmission through the camshaft or through a dedicated internal drive shaft according to the present invention can increase the length of the drive train to reduce stiffness and decrease the first mode natural frequency of the powertrain while achieving gear reduction. This results in the translation of resonance frequencies arising from the convergence of the first mode natural frequency with excitatory engine harmonics to lower rpm with marked reduction in torsional deflections, torsional stresses, torsional moments and potential gear hammering. This approach may be useful in overcoming current obstacles in the development of reliable aviation diesel engines of higher power for general aviation. The approach can also be applied to two-stroke and spark ignition engines and to engines with differing numbers and arrangements of cylinders.

From the foregoing, it will be understood that the methods and embodiments of the present invention will provide a number of advantages. For example, an internal combustion engine according to the present invention avoids the requirement for a separate speed reduction gearbox. At the same time, it provides a means to reduce vibration, allowing for the development of a compression ignition engine in the 300-350 hp range to fulfill the weight and power requirements for general aviation aircraft in the Cirrus SR22T class. The engine could also fulfill requirements for other applications including unmanned aerial vehicles, marine craft and certain land vehicles.

Upon reading this disclosure, those skilled in the art will appreciate that various changes and modifications may be made to the embodiments and methods of the invention and that such changes and modifications may be made without departing from the spirit of the invention. For example, although the presented modeling was performed with a 4-stroke, 6 cylinder, compression ignition engine the same principles can be applied to engines that are 2-stroke use spark ignition and have differing numbers and arrangements of cylinders. Therefore, the invention in its broader aspects is not limited to the specific details, representative devices, and illustrative examples shown and described. Accordingly, departures may be made from such details without departing from the spirit or scope of the general inventive concept.

What is claimed is:

1. An internal combustion engine for use with a propeller driven aircraft, the engine comprising:
 a crank case housing having a forward wall and a rearward wall;
 a crankshaft journaled within the crank case housing and rotatable about a crankshaft axis, wherein the crankshaft is configured to be rotatably driven by a plurality of pistons consisting of six pistons and a crankshaft rear end extends through the housing rearward wall;
 a power output shaft journaled within the crank case housing and having a front end that extends through the housing forward wall and a rear end that extends through the housing rearward wall, wherein the power output shaft is rotatable about a power output shaft axis that is generally parallel to the crankshaft axis; and
 a gear set configured to transfer rotational power from the crankshaft to the power output shaft and to rotate the power output shaft at a velocity that is proportional to the rotational velocity of the crankshaft, wherein the gear set is disposed rearward of the engine housing rearward wall.

2. The internal combustion engine of claim 1 wherein the power output shaft front end is adapted for mounting the propeller thereto.

3. The internal combustion engine of claim 1 wherein the engine is a compression ignition engine.

4. The internal combustion engine of claim 1 wherein the engine has a boxer engine configuration.

5. The internal combustion engine of claim 1 wherein the engine has a peak output power within a range from about 300 horsepower to about 350 horsepower.

6. The internal combustion engine of claim 1 wherein the gear set is configured to provide speed reduction and torque multiplication.

7. The internal combustion engine of claim 1 wherein the length of the power output shaft reduces engine torsional vibration.

8. The internal combustion engine of claim 1 wherein the gears of the gear set are adapted to rotate the power output shaft in a direction opposite the crankshaft rotation.

9. An internal combustion engine for use with a propeller driven aircraft, the engine comprising:
 a crank case housing having a forward wall and a rearward wall; and
 a drive train comprising:
  a crankshaft journaled within the crank case housing and rotatable about a crankshaft axis, wherein the crankshaft is configured to be rotatably driven by a plurality of pistons consisting of six pistons and a crankshaft rear end extends through the housing rearward wall;
  a power output shaft journaled within the crank case housing and having a front end that extends through the housing forward wall and a rear end that extends through the housing rearward wall, wherein the power output shaft is rotatable about, an output axis that is generally parallel to the crankshaft axis; and
  a gear set configured to transfer rotational power from the crankshaft to the power output shaft and to rotate the power output shaft at a velocity that is proportional to the rotational velocity of the crankshaft, wherein the gear set is disposed rearward of the engine housing rearward wall;
 wherein the drive train has a mode 1 natural frequency and the engine has a high speed normal operating range; and
 wherein the convergence of the drive train mode 1 natural frequency with each of one or more engine dominant harmonic excitation frequencies occurs at an engine speed that is displaced below the engine high speed normal operating range.

10. The internal combustion engine of claim 9 wherein the engine is a compression ignition engine.

11. The internal combustion engine of claim 9 wherein the engine has a boxer engine configuration.

12. The internal combustion engine of claim 9 wherein the engine has a peak output power within a range from about 300 horsepower to about 350 horsepower.

13. The internal combustion engine of claim 9 wherein the gear set is configured to provide speed reduction and torque multiplication.

14. The internal combustion engine of claim 1 wherein the gears of the gear set can be adapted to rotate the output shaft in a direction opposite the crankshaft rotation.

15. The internal combustion engine of claim 9 wherein the drive train mode 1 natural frequency converges with each of the one or more engine dominant harmonic excitation frequencies at an engine speed that is less than about 60% of the lower end of the engine high speed normal operating range.

16. The internal combustion engine of claim 9 wherein the one or more engine dominant harmonic excitation natural frequencies comprise a third order harmonic excitation frequency and a sixth order harmonic excitation frequency.

17. The internal combustion engine of claim 9 wherein the drive train mode 1 natural frequency converges with each of the one or more engine dominant harmonic excitation frequencies at an engine speed that at least 1200 rpm below a lower end of the engine high speed normal operating range.

18. The internal combustion engine of claim 9 wherein the drive train mode 1 natural frequency is about 88 Hz, the drive train mode 1 natural frequency converges with a third order harmonic excitation frequency at about 1755 rpm, and the drive train mode 1 natural frequency converges with the sixth order harmonic excitation frequency at about 878 rpm.

19. The internal combustion engine of claim 1 wherein the power output shaft comprises a camshaft.

* * * * *